United States Patent
Kobashi et al.

(10) Patent No.: US 9,582,214 B2
(45) Date of Patent: Feb. 28, 2017

(54) DATA ACCESS METHOD AND DATA ACCESS APPARATUS FOR MANAGING INITIALIZATION OF STORAGE AREAS

(71) Applicant: FUJITSU LIMITED, Kawasaki-shi, Kanagawa (JP)

(72) Inventors: Kazunori Kobashi, Yamato (JP); Toshihide Yanagawa, Yokohama (JP); Hiroshi Murayama, Fuji (JP); Hiroyuki Ando, Sayama (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 14/485,830

(22) Filed: Sep. 15, 2014

(65) Prior Publication Data

US 2015/0006818 A1    Jan. 1, 2015

Related U.S. Application Data

(63) Continuation of application No. PCT/JP2012/056985, filed on Mar. 19, 2012.

(51) Int. Cl.
*G06F 3/06* (2006.01)

(52) U.S. Cl.
CPC .......... *G06F 3/0632* (2013.01); *G06F 3/0604* (2013.01); *G06F 3/0617* (2013.01); *G06F 3/0689* (2013.01)

(58) Field of Classification Search
CPC .... G06F 9/5077; G06F 9/5016; G06F 3/0604; G06F 3/0617; G06F 3/0689;
(Continued)

(56) References Cited

U.S. PATENT DOCUMENTS 5,680,640 A    10/1997   Ofek et al.
5,829,022 A * 10/1998   Watanabe ......... G06F 17/30607
                                                             707/999.1

(Continued)

FOREIGN PATENT DOCUMENTS

EP           0789877         7/2002
JP           04-070921       3/1992
(Continued)

OTHER PUBLICATIONS

International Search Report, mailed in connection with PCT/JP2012/056985 and mailed Jun. 12, 2012 (2 pages).

(Continued)

*Primary Examiner* — Jared Rutz
*Assistant Examiner* — Khoa D Doan
(74) *Attorney, Agent, or Firm* — Fujitsu Patent Center

(57) ABSTRACT

A storage system manages initialization status of a storage area block by block. The storage system allows reception of an access request indicating data write to Storage Area #1, which is a part of an uninitialized block. Upon receiving the access request, the storage system writes data to the designated Storage Area #1 without initializing Storage Area #1, and initializes, of the uninitialized block, Storage Area #2 not designated by the access request. The storage system determines that initialization of the uninitialized block has been completed with the data write to Storage Area #1 and the initialization of Storage Area #2.

3 Claims, 20 Drawing Sheets

(58) Field of Classification Search
CPC ........... G06F 3/0632; G06F 2212/1041; G06F 2212/1044; G06F 3/0665; G06F 12/1441
See application file for complete search history.

(56) References Cited

U.S. PATENT DOCUMENTS

| | | | | |
|---|---|---|---|---|
| 6,144,607 | A * | 11/2000 | Sassa | G11C 16/16 365/185.33 |
| 7,711,897 | B1 * | 5/2010 | Chatterjee | G06F 3/0605 711/112 |
| 7,797,478 | B2 * | 9/2010 | Sasaki | G06F 3/0616 711/102 |
| 8,364,920 | B1 * | 1/2013 | Parkison | G06F 11/1453 711/161 |
| 8,397,038 | B2 * | 3/2013 | Scales | G06F 3/0608 711/156 |
| 9,086,805 | B2 * | 7/2015 | Feldman | G06F 3/0605 |
| 2003/0018864 | A1 * | 1/2003 | Ikeuchi | G06F 3/061 711/161 |
| 2004/0221102 | A1 * | 11/2004 | Watanabe | G06F 3/0611 711/112 |
| 2006/0038820 | A1 * | 2/2006 | Kitani | G06F 21/80 345/531 |
| 2008/0235479 | A1 * | 9/2008 | Scales | G06F 3/0608 711/166 |
| 2009/0307423 | A1 * | 12/2009 | Galloway | G06F 11/1076 711/114 |
| 2010/0218038 | A1 * | 8/2010 | Ikeuchi | G06F 11/2082 714/6.12 |
| 2011/0246717 | A1 * | 10/2011 | Kobayashi | G06F 11/1096 711/114 |
| 2012/0131271 | A1 * | 5/2012 | Araki | G06F 3/061 711/112 |
| 2012/0159071 | A1 * | 6/2012 | Kamon | G06F 3/0605 711/118 |
| 2012/0331242 | A1 * | 12/2012 | Shaikh | G06F 12/0261 711/154 |
| 2014/0149674 | A1 * | 5/2014 | Solihin | G06F 12/0826 711/133 |
| 2014/0325157 | A1 * | 10/2014 | Sangapu | G06F 3/061 711/126 |
| 2016/0077761 | A1 * | 3/2016 | Stabrawa | G06F 3/0604 711/172 |

FOREIGN PATENT DOCUMENTS

| | | |
|---|---|---|
| JP | 8-96588 A | 4/1996 |
| JP | 8-202529 A | 8/1996 |
| JP | 10-508967 | 9/1998 |
| JP | 11-15705 A | 1/1999 |
| JP | 2003-29934 | 1/2003 |
| JP | 2003-045117 | 2/2003 |
| JP | 2004-357078 | 12/2004 |
| JP | 2005-011317 | 1/2005 |
| JP | 2006-059179 | 3/2006 |
| JP | 2006-216146 | 8/2006 |
| WO | 97/09676 | 3/1997 |

OTHER PUBLICATIONS

Written Opinion of the International Searching Authority issued for PCT/JP2012/056985 on Jun. 12, 2012 (8 pages).
Japanese Office Action mailed Aug. 30, 2016 for corresponding Japanese Patent Application No. 2014-505826, with Partial English Translation, 6 pages.

* cited by examiner

| SEGMENT ID | STORAGE | STATE | VDISK | |
|---|---|---|---|---|
| SEGMENT #10 | DISK #1 | FREE | — | 411 |
| SEGMENT #11 | DISK #1 | VALID | VDISK #1 | |
| SEGMENT #12 | DISK #1 | TZERO+ | VDISK #2 | |
| SEGMENT #21 | DISK #2 | TZERO | — | |
| SEGMENT #22 | DISK #2 | TZERO | — | |
| SEGMENT #23 | DISK #2 | VALID | VDISK #2 | |
| ⋮ | ⋮ | ⋮ | ⋮ | |

FIG. 7

| INDEX | INITIALIZATION FLAG | 111 |
|---|---|---|
| 0 | 1 | |
| 1 | 0 | |
| 2 | 0 | |

FIG. 9

| CHUNK ID | EXCLUSION BIT | INITIALIZATION BIT |
|---|---|---|
| CHUNK #0 | 1 | 1 |
| CHUNK #1 | 0 | 0 |
| CHUNK #2 | 1 | 0 |
| CHUNK #3 | 0 | 1 |
| CHUNK #4 | 1 | 1 |
| CHUNK #5 | 0 | 0 |
| ⋮ | ⋮ | ⋮ |
| CHUNK #254 | 0 | 0 |
| CHUNK #255 | 0 | 0 |

FIG. 10

DATA ACCESS METHOD AND DATA ACCESS APPARATUS FOR MANAGING INITIALIZATION OF STORAGE AREAS

CROSS-REFERENCE TO RELATED APPLICATION

This application is a continuation application of International Application PCT/JP2012/056985 filed on Mar. 19, 2012 which designated the U.S., the entire contents of which are incorporated herein by reference.

FIELD

The embodiments discussed herein are related to a data access method and a computer-readable storage medium storing a computer program.

BACKGROUND

There are currently services that allocate hardware resources of computers installed at a hub, such as a data center, to users and allow them to use the hardware resources. Such a service may be implemented using cloud computing technology, and is sometimes referred to as Infrastructure as a Service (IaaS). The hardware resources allocated to users may include storage areas of memory apparatuses, such as hard disk devices. For example, when creating a virtual machine for a user, a computer selects a storage area from pooled, unallocated storage areas and allows the virtual machine to use the selected storage area. When, for example, deleting the virtual machine created for the user, the computer releases the storage area of the virtual machine and adds it back to the pooled storage areas.

The above-described method for dynamically allocating a storage area may reallocate a storage area used by a user in the past to a different user. In this regard, it is preferable to initialize (format) the storage area to be reallocated in terms of security so that information of the previous user is not passed onto the next user. The computer initializes the storage area, for example, by writing a predetermined bit sequence to the storage area. The initialization of the storage area is preferably completed before the storage area becomes accessible due to the reallocation.

Note however that because the initialization process sometimes takes much time, it may be considered desirable to allow a storage area whose initialization has not been completed to be allocated to a user so as not to keep the user waiting in the stage of hardware resource allocation whilst proceeding with the initialization in the background. If, when access to a storage area is requested by the user, the initialization of the storage area has yet to be completed, the coordination between the data access and the initialization process needs to be adjusted.

For example, a storage control apparatus has been proposed which determines, in response to an access request from a host, whether an area on a disk to which access is requested has already been formatted, and then logically formats the area before the disk access if the area has not yet been formatted. In addition, a recording and reproducing apparatus has been proposed in which, in response to a data recording request from a host computer after background formatting of a storage medium is started, the background formatting is interrupted to allow data to be recorded on the storage medium. Further, a storage system has been proposed in which, in response to a read request designating an uninitialized area, predetermined null data is returned, and in response to a write request designating an uninitialized area, write access is caused to wait until initialization of the designated area is completed.

Japanese Laid-open Patent Publication No. 2003-29934
Japanese Laid-open Patent Publication No. 2003-45117
Japanese Laid-open Patent Publication No. 2005-11317

However, there is room for improvement in the conventional technologies described above in terms of the coordination between the data access and the initialization process. For example, the method for simply interrupting the initialization process to thereby write data to a designated storage area in response to a write request fragments a storage area to be initialized, which possibly results in cumbersome and inefficient control of the initialization process.

SUMMARY

According to an aspect, there is provided a data access method executed by a storage system capable of managing, with respect to each block, initialization status of storage areas provided by one or more memory apparatuses. The data access method includes writing, by a processor, upon receiving an access request indicating data write to a first storage area being a part of an uninitialized block, data to the first storage area without initializing the first storage area and completing initialization of the entire storage area of the uninitialized block by instructing the memory apparatuses to initialize a second storage area not designated by the access request. The second storage area is the remaining storage area of the uninitialized block, other than the first storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a segment table;
FIG. 9 illustrates an example of a segment state table;
FIG. 10 illustrates an example of a chunk management bitmap.

DESCRIPTION OF EMBODIMENTS

Figure 1:
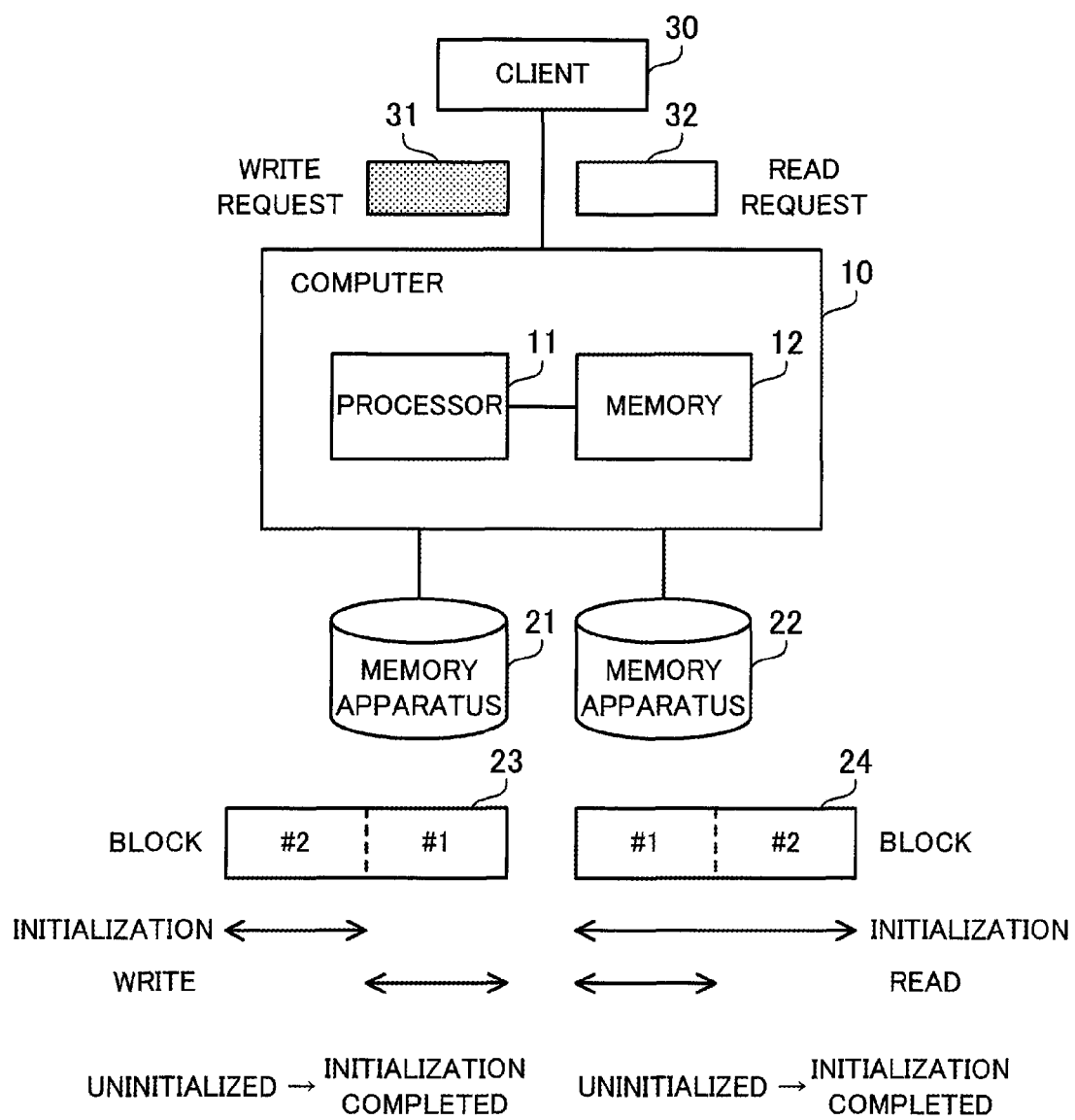
FIG. 1 illustrates a storage system according to a first embodiment.

Several embodiments will be described below with reference to the accompanying drawings, wherein like reference numerals refer to like elements throughout.

(a) First Embodiment

FIG. 1 illustrates a storage system according to a first embodiment. The storage system of the first embodiment includes a computer 10 and memory apparatuses 21 and 22.

The computer 10 is connected to the memory apparatuses 21 and 22 via a network. Each of the memory apparatuses 21 and 22 is, for example, a device equipped with a non-volatile storage medium such as a hard disk. In response to an access request from a client 30, the computer 10 accesses data in the memory apparatuses 21 and 22, and returns the access result to the client 30. The client 30 may be a computer other than the computer 10, or software (a virtual machine, for example) running on the computer 10. In the former case, the computer 10 receives the access request from the client 30 via a network.

The computer 10 initializes storage areas provided by the memory apparatuses 21 and 22. In the initialization, for example, a predetermined bit sequence is written to a storage area as an initialization value, to thereby delete data previously stored therein so as not to be read. The computer 10 divides the storage areas provided by the memory apparatuses 21 and 22 into a plurality of blocks and manages the initialization status of each block. The individual blocks may be storage areas of a fixed size (for example, 1 megabyte). The computer 10 holds, for example, a bitmap indicating whether each block has already been initialized.

The computer 10 includes a processor 11 such as a central processing unit (CPU), and memory 12 such as random access memory (RAM). The memory 12 stores therein programs for data access and the initialization process, and the processor 11 executes the programs stored in the memory 12. Note however that the computer 10 may be provided with an electronic circuit, such as an application specific integrated circuit (ASIC) and a field programmable gate array (FPGA), in place of or together with the processor 11. In addition, the processor 11 may be provided with circuits dedicated for data access and the initialization process, in place of or together with a versatile computing unit for executing program instructions.

The storage system of the first embodiment allows an access request from the client 30 to be received even during background initialization. In this regard, the computer 10 adjusts the coordination between the initialization process and data access as described below.

The computer 10 receives, from the client 30, an access request 31 to write data to Storage Area #1 which is a part of an uninitialized block 23. Upon receiving the access request 31, the computer 10 writes data to Storage Area #1 of the block 23, designated by the access request 31, without initializing Storage Area #1. In addition, upon receiving the access request 31, the computer 10 initializes Storage Area #2 in the block 23, which is not designated by the access request 31. Storage Area #2 is preferably the entire remaining storage area of the block 23, other than the designated Storage Area #1.

The computer 10 returns, to the client 30, an access result (for example, success or failure of the write access) obtained in response to the access request 31. In addition, the computer 10 determines that initialization of the block 23 has been completed with the data write to Storage Area #1 and the initialization of Storage Area #2 carried out in response to the access request 31. Herewith, in the initialization process running in the background, the block 23 is removed from initialization targets. For example, the computer 10 sets, in the bitmap, a bit corresponding to the block 23 to indicate that the block 23 has already been initialized.

In addition, the computer 10 receives, from the client 30, an access request 32 to read data from Storage Area #1 which is a part of an uninitialized block 24. Upon receiving the access request 32, the computer 10 initializes, of the block 24, Storage Area #1 designated by the access request 32 and Storage Area #2 not designated by the access request 32. Storage Areas #1 and #2 together preferably form the entire block 24.

The computer 10 outputs data corresponding to the initialized Storage Area #1 to the client 30 as an access result obtained in response to the access request 32. In this regard, the computer 10 may read data from the initialized Storage Area #1 and output the read data as the access result, or may store, in the memory 12, an initialization value written to Storage Area #1 and then output the initialization value as the access result. In addition, the computer 10 determines that initialization of the block 24 has been completed with the initialization of Storage Areas #1 and #2 carried out in response to the access request 32. Herewith, from then on, the block 24 is removed from initialization targets.

Note that the computer 10 may have exclusive control over each block, applying only one of a first process of sequentially initializing a plurality of blocks in the background and a second process of accessing data in response to the access request 31/32. For example, the computer 10 holds a bitmap indicating whether each block is currently in operation, and controls each block in such a manner as to be initialized by only one of the first and second processes.

For example, when the block 23/24 is being initialized by the first process, the computer 10 suspends data write or read according to the access request 31/32 until the initialization is finished. On the other hand, for example, when detecting that data access involving initialization is being made to the block 23/24 by the second process, the computer 10 removes the block 23/24 from targets to be initialized by the first process.

According to the storage system of the first embodiment, it is possible to allocate the uninitialized blocks 23 and 24 to the client 30, to thereby reduce the time for the client 30 to wait for storage area allocation. In addition, in response to the access request 31 to write data to the block 23, data is written directly to the designated Storage Area #1 without initialization of Storage Area #1, thus reducing response delay compared to the case of writing data after initialization of Storage Area #1. Further, along with the data write to Storage Area #1 in the block 23, initialization of Storage Area #2 not designated by the access request 31 takes place. This allows the entire block 23 to be treated as having already been initialized, thus simplifying control of the initialization process running in the background.

In addition, in response to the access request for data read from the block 24, the block 24 is initialized, thereby reducing load generated when the block 24 is accessed a plurality of times compared to the case of returning an initialization value without initializing the block 24. In addition, together with the designated Storage Area #1, Storage Area #2 not designated is also initialized, which allows the entire block 24 to be treated as having already been initialized. This simplifies control of the initialization process running in the background. In this manner, the storage system of the first embodiment is capable of achieving the efficiency of data access while achieving the efficiency of the initialization process, thus improving the processing efficiency of the storage system.

Note that, in the description above, the computer 10 carries out both the process of initializing the block 23 in response to a write request and the process of initializing the block 24 in response to a read request. However, the computer 10 may be configured to perform only one of these processes described above.

(b) Second Embodiment

Figure 2:
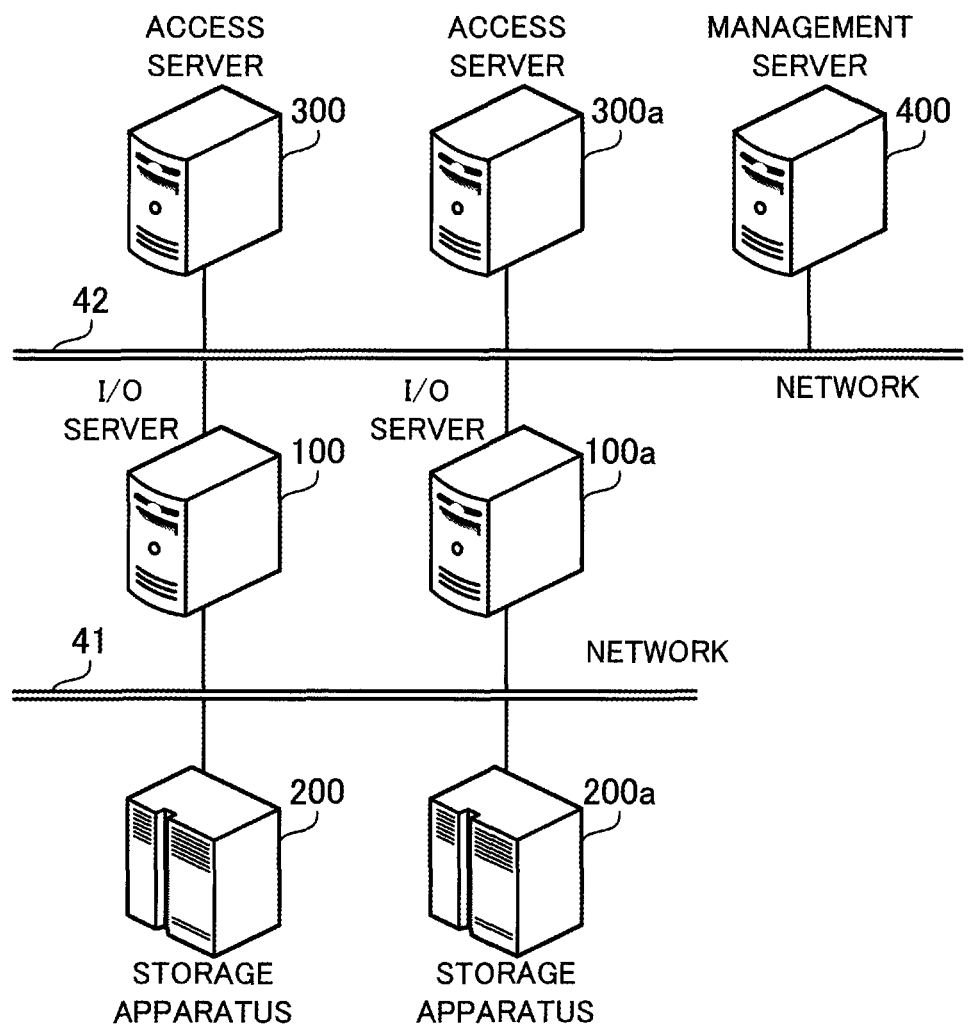
FIG. 2 illustrates a storage system according to a second embodiment.

FIG. 2 illustrates a storage system according to a second embodiment. The storage system of the second embodiment includes Input/Output (I/O) servers 100 and 100a, storage apparatuses 200 and 200a, access servers 300 and 300a, and a management server 400. The I/O servers 100 and 100a communicate with the storage servers 200 and 200a via a network 41. The I/O servers 100 and 100a communicate with the access servers 300 and 300a and the management server 400 via a network 42.

Each of the I/O servers 100 and 100a is a server computer for accessing the storage apparatuses 200 and 200a. Upon receiving an access request designating a logical address from the access server 300/300a, the I/O server 100/100a converts the logical address to a physical address to thereby access the storage apparatuses 200 and 200a. There are two types of access request, write requests and read requests. In addition, according to an instruction of the management server 400, the I/O server 100/100a initializes storage areas provided by the storage apparatuses 200 and 200a in the background. The initialization of the storage areas may also be performed when access is made to the storage apparatuses 200 and 200a in response to an access request.

The storage apparatuses 200 and 200a are server computers each equipped with a non-volatile memory device such as a hard disk and managing data stored in the memory device. According to access from the I/O servers 100 and 100a, the storage apparatuses 200 and 200a individually write and read data to and from the corresponding memory devices.

The access servers 300 and 300a are server computers on each of which one or more virtual machines operate. Each of the virtual machines is created in response to a request from a user, and executes an operating system (OS) and application software independently of other virtual machines. On each of the access servers 300 and 300a, virtualization software (for example, hypervisor) for controlling the virtual machines is operating. In response to a request from each user, the virtualization software allocates hardware resources, such as a CPU and RAM, to a virtual machine of the user to thereby start the virtual machine. In addition, the virtualization software allows each virtual machine to access, via the I/O server 100/100a, storage areas in the storage apparatuses 200 and 200a, allocated to the virtual machine by the management server 400.

The management server 400 manages storage areas of the storage apparatuses 200 and 200a. In response to a user or an administrator (in response to, for example, a command input), the management server 400 allocates part of the storage areas of the storage apparatuses 200 and 200a to a virtual machine as a logical disk. Then, the management server 400 designates an I/O server to be used by the virtual machine so that the virtual machine is able to access the logical disk. The designation of the I/O server is made, for example, in such a manner as to balance the access load between the I/O servers 100 and 100a.

In addition, in response to a request from a user or the administrator, the management server 400 releases storage areas having been allocated to a virtual machine as a logical disk. For security reasons, the management server 400 instructs the I/O server 100/100a to initialize the released storage areas before or after reallocating the storage areas to different virtual machines (background initialization process). The storage areas of the storage apparatuses 200 and 200a are allocated to virtual machines by storage area units of a fixed size, called segments, as described later.

Note that the storage system of the second embodiment is installed, for example, in a data center and used for cloud computing. In the example of FIG. 2, the networks 41 and 42 are separately provided, however, these networks may be provided as a single network instead. In addition, according to the second embodiment, the I/O servers 100 and 100a are separately provided from the access servers 300 and 300a, however, the functions of the I/O servers 100 and 100a may be implemented on the virtualization software of the access servers 300 and 300a. The I/O servers 100 and 100a are examples of the aforementioned computer 10, the storage apparatuses 200 and 200a are examples of the aforementioned memory apparatuses 21 and 22, and the access servers 300 and 300a are examples of the aforementioned client 30.

Figure 3:
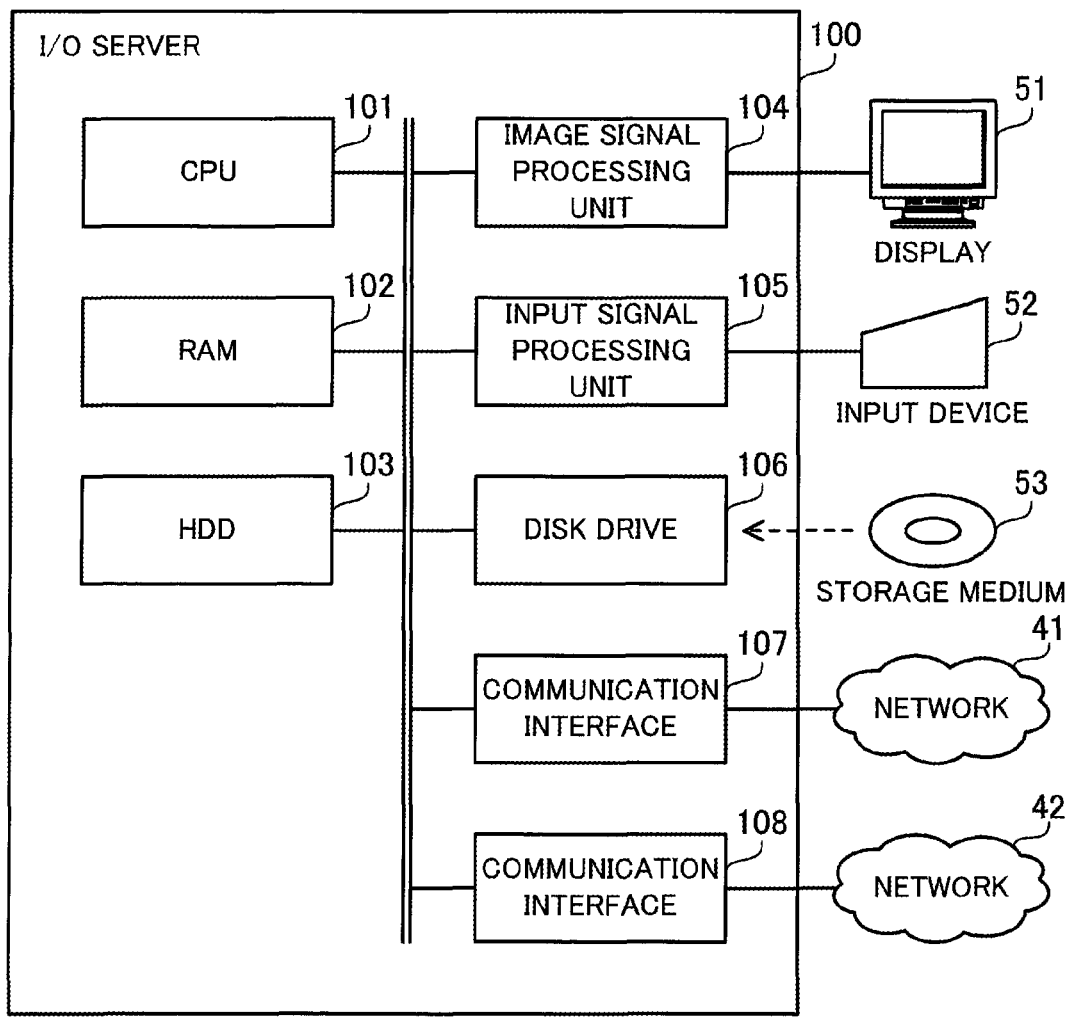
FIG. 3 is a block diagram illustrating an example of hardware of a server.

FIG. 3 is a block diagram illustrating an example of hardware of a server. The I/O server 100 includes a CPU 101, RAM 102, a hard disk drive (HDD) 103, an image signal processing unit 104, an input signal processing unit 105, a disk drive 106, and communication interfaces 107 and 108. These individual units are connected to a bus. Each of the I/O server 100a, storage apparatuses 200 and 200a, access servers 300 and 300a, and management server 400 may have the same hardware configuration as the I/O server 100. Note that the CPU 101 and the RAM 102 are examples of the aforementioned processor 11 and memory 12, respectively.

The CPU 101 is a processor including a computing unit for carrying out program instructions. The CPU 101 reads at least part of a program and data from the HDD 103 and loads them into the RAM 102 to execute the program. Note that the I/O server 100 may execute a plurality of processes in parallel, using a plurality of processors.

The RAM 102 is volatile memory for temporarily storing the program to be executed by the CPU 101 and data to be used by the CPU 101 for its information processing. Note that the I/O server 100 may include a different type of memory other than RAM, or may include a plurality of memory devices.

The HDD 103 is a non-volatile memory device for storing programs such as the OS program and application programs, and various types of data. The HDD 103 writes and reads data to and from a built-in magnetic disk according to instructions of the CPU 101. Note that the I/O server 100 may include a different type of non-volatile memory device (for example, a solid state drive (SSD)) other than a HDD, or may include a plurality of memory devices.

The image signal processing unit 104 outputs an image to a display 51 connected to the I/O server 100 according to an instruction of the CPU 101. A cathode ray tube (CRT) display or a liquid crystal display, for example, may be used as the display 51.

The input signal processing unit 105 acquires an input signal from an input device 52 connected to the I/O server 100 and outputs the input signal to the CPU 101. A pointing device, such as a mouse and a touch panel, or a keyboard may be used as the input device 52.

The disk drive 106 is a drive unit for reading programs and data recorded on a storage medium 53. Examples of the storage medium 53 include a magnetic disk such as a flexible disk (FD) and a HDD, an optical disk such as a compact disc (CD) and a digital versatile disc (DVD), and a magneto-optical disk (MO). According to instructions of the CPU 101, the disk drive 106 stores the programs and data read from the storage medium 53 in the RAM 102 or the HDD 103.

The communication interface 107 is able to communicate with the storage apparatuses 200 and 200a via the network 41. The communication interface 108 is able to communicate with the access servers 300 and 300a and the management server 400 via the network 42. The communication interfaces 107 and 108 may be wired or wireless interfaces.

Figure 4:
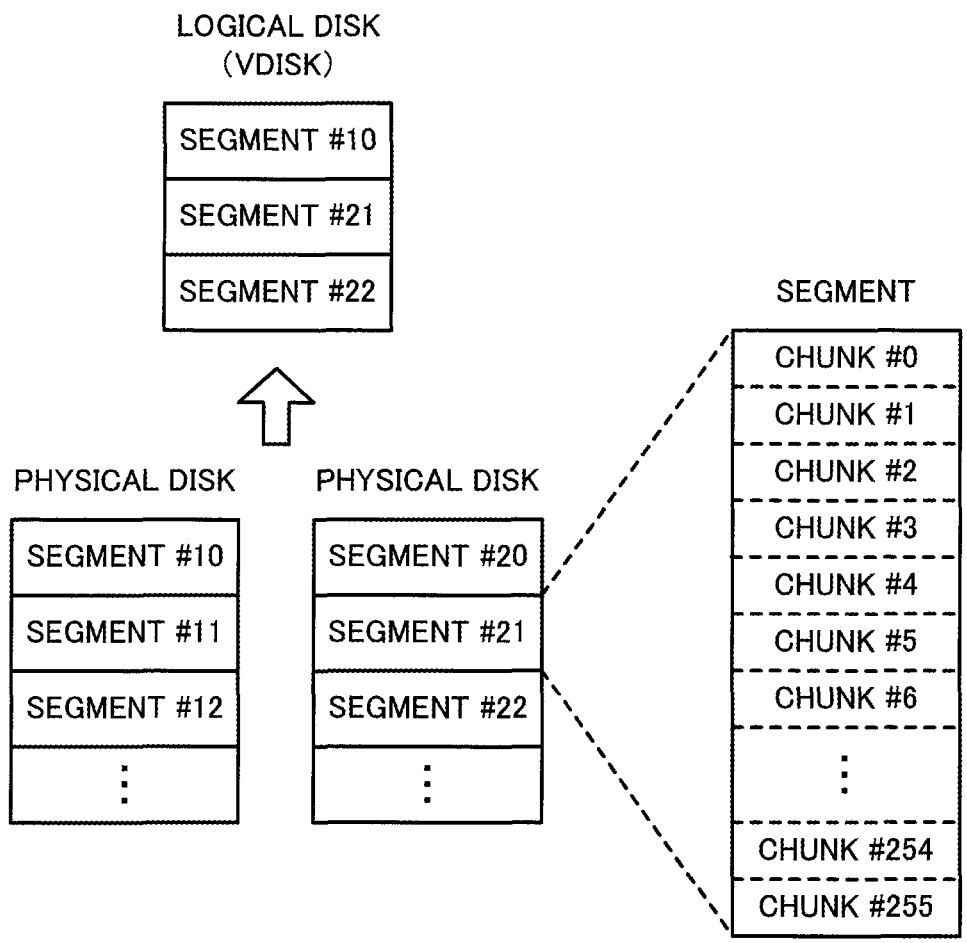
FIG. 4 illustrates an example of a configuration of a logical disk.

FIG. 4 illustrates an example of a configuration of a logical disk. As described above, the I/O servers 100 and 100a and the management server 400 manage the storage areas of the storage apparatuses 200 and 200a by dividing them into a plurality of segments. Each segment is a storage area of a fixed size (for example, 256 megabytes). For example, the storage area of a physical disk (for example, a HDD) of the storage apparatus 200 includes Segments #10, #11, and #12, and the storage area of a physical disk of the storage apparatus 200a includes Segments #20, #21, and #22.

The management server 400 selects, from a plurality of pooled segments, one or more segments corresponding to a size requested by a user, and collectively allocates the segments to a virtual machine of the user as a logical disk (VDISK). For example, the management server 400 creates one logical disk by putting together three segments of Segment #10 of the storage apparatus 200 and Segments #21 and #22 of the storage apparatus 200a. It appears to the virtual machine as if the allocated logical disk were a physical disk. In the case where the logical disk includes a plurality of segments, it appears to the virtual machine as if the segments were a continuous storage area. The virtual machine designates a location in the storage area on the logical disk using a logical address.

The management server 400 manages initialization status of the storage area with respect to each segment. On the other hand, each of the I/O servers 100 and 100a manage initialization status of the storage area by chunk by chunk, which is a smaller unit than a segment, as well as segment by segment. Each segment includes a plurality of chunks (for example, 256 chunks) of a fixed size (for example, 1 megabyte). Upon receiving an instruction from the management server 400 to initialize a segment in the background, the I/O server 100/100a manages the progress of the initialization by chunk units, and exercises, over each chunk, exclusive control applying only one of the following processes: a process in response to an access request from a virtual machine; and a background initialization process. Note that chunks are an example of the blocks 23 and 24 of the first embodiment.

Figure 5:
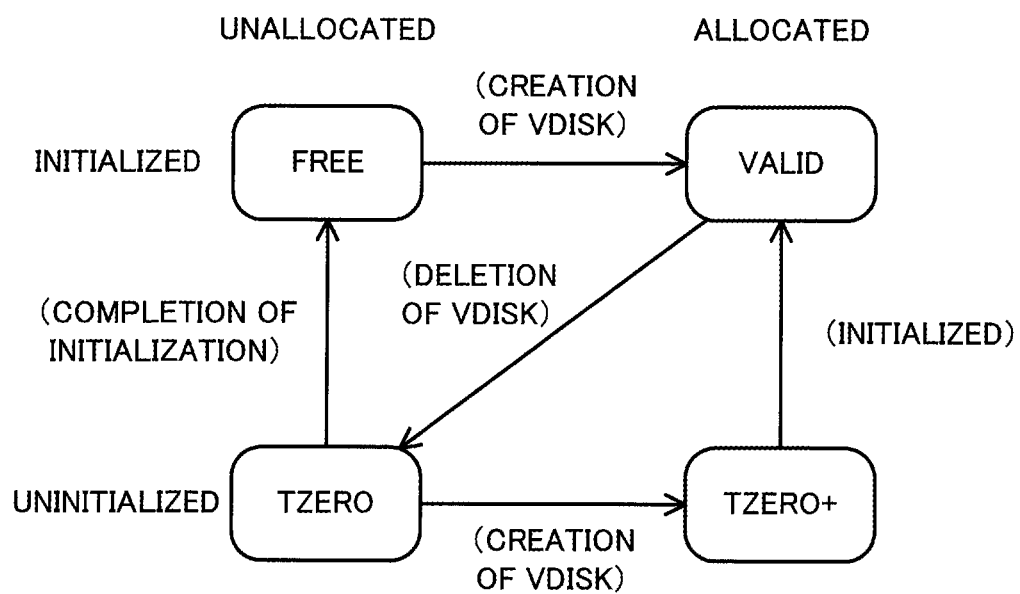
FIG. 5 illustrates state transitions of a segment.

FIG. 5 illustrates state transitions of a segment. Each segment of the storage apparatuses 200 and 200a is in one of four states of FREE, VALID, TZERO, and TZERO+. The state of each segment is managed by the management server 400.

FREE indicates that all chunks in the segment have already been initialized and the segment is not in use for any logical disk. VALID indicates that all chunks in the segment have already been initialized and the segment is in use for a logical disk. TZERO indicates that at least one chunk in the segment is uninitialized and the segment is not in use for any logical disk. TZERO+ indicates that at least one chunk in the segment is uninitialized and the segment is in use for a logical disk.

When a logical disk is created using a segment in FREE state, the state of the segment changes from FREE to VALID. When a logical disk including a segment in VALID state is deleted, the state of the segment changes from VALID to TZERO. When all chunks in a segment in TZERO state are initialized, the state of the segment changes from TZERO to FREE. When the management server 400 creates a new logical disk, segments in FREE state, whose initialization has already been completed, are selected in principle.

Note however that, when creation and deletion of logical disks take place so frequently that the background initialization process is not able to keep up with the pace and thus segments in FREE state are in short supply, a logical disk may be created using a segment in TZERO state. When a logical disk is created using a segment in TZERO state, whose initialization has not been completed, the state of the segment changes from TZERO to TZERO+. Once all the chunks of the segment in TZERO+ state are initialized, the state of the segment changes from TZERO+ to VALID. Each chunk of the segment in TZERO+ state may be initialized in background initialization, or may be initialized as a result of an access request from a virtual machine.

Figure 6:
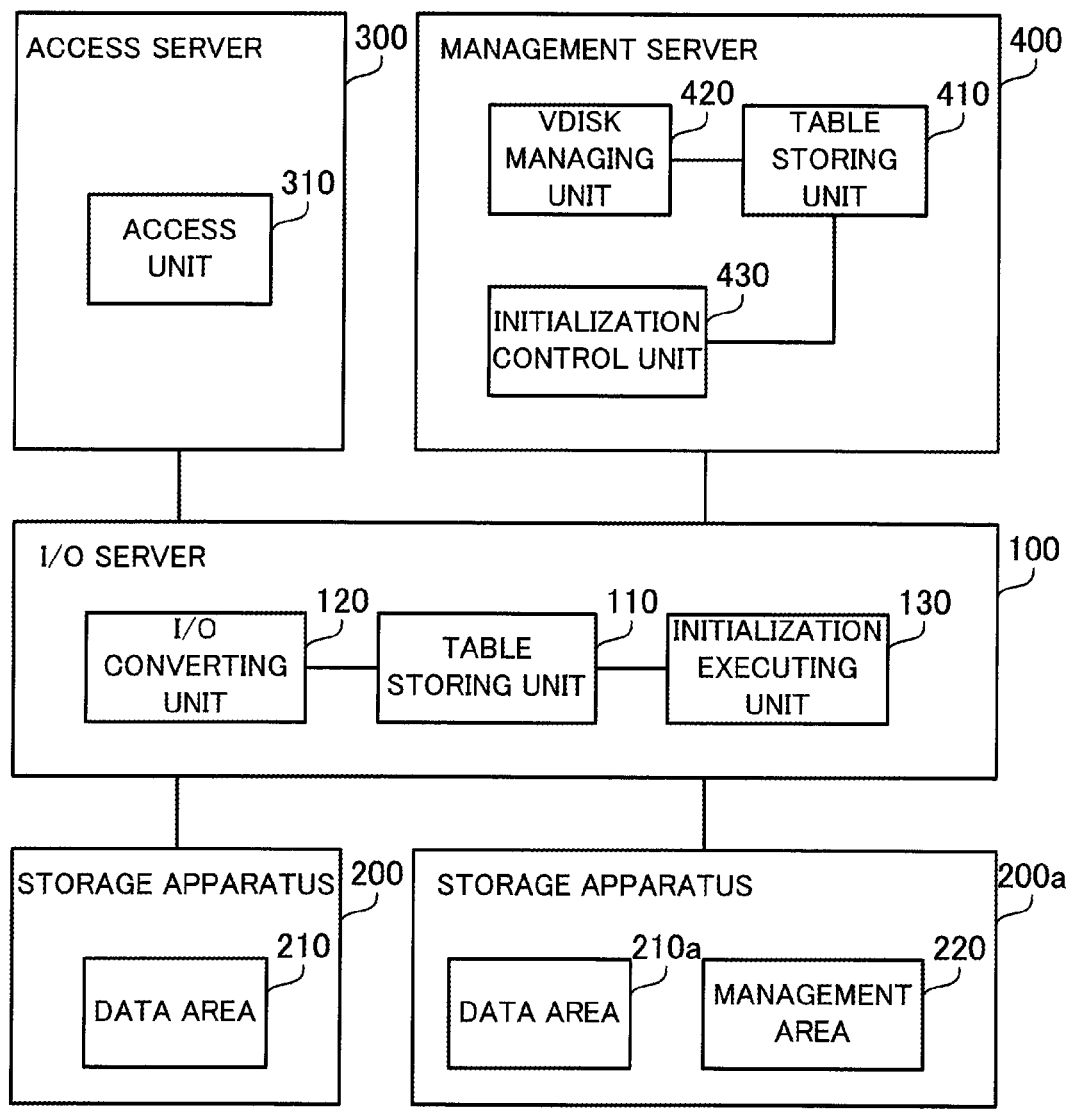
FIG. 6 is a block diagram illustrating an example of software running on each server.

FIG. 6 is a block diagram illustrating an example of software running on each server. The following description of the second embodiment is directed to the case where a virtual machine running on the access server 300 accesses the storage apparatuses 200 and 200a via the I/O server 100.

The I/O server 100 includes a table storing unit 110, an I/O converting unit 120, and an initialization executing unit 130. The table storing unit 110 is implemented, for example, using part of the storage area of the RAM 102. The I/O converting unit 120 and the initialization executing unit 130 are implemented, for example, as program modules. The I/O server 100a may have the same software configuration as the I/O server 100.

The table storing unit 110 stores therein a segment state table indicating initialization status of individual segments included in logical disks for which the I/O server 100 has been designated as an I/O server used for data access. In addition, the table storing unit 110 stores, for each segment whose initialization has not been completed, a chunk management bitmap including an initialization bitmap indicating the initialization status of each chunk and an exclusion bitmap indicating an exclusion flag for each chunk.

The I/O converting unit 120 receives an access request from the access server 300, then converts a logical address designated by the access request into a physical address, and transmits data write commands or data read commands to the storage apparatuses 200 and 200a. In this regard, referring to the segment state table and the chunk management bitmap stored in the table storing unit 110, the I/O converting unit 120 determines whether a storage area to be accessed includes uninitialized chunks. If the storage area includes uninitialized chunks, the I/O converting unit 120 causes chunks at the access destination to be initialized, with a process according to the access request.

The initialization executing unit 130 receives an initialization request from the management server 400 and proceeds with a background initialization process chunk by chunk for segments designated by the initialization request. In the chunk initialization, the initialization executing unit 130 transmits, to the storage apparatuses 200 and 200a, a command to write a predetermined bit sequence of an initialization value across the entire chunk. In this regard, referring to the segment state table and the chunk management bitmap stored in the table storing unit 110, the initialization executing unit 130 searches for an uninitialized chunk not being accessed by the I/O converting unit 120 and selects the chunk as a chunk to be initialized next.

On a physical disk (for example, a HDD) of the storage apparatus 200, a data area 210 is formed. On a physical disk of the storage apparatus 200a, a data area 210a and a management area 220 are formed. Each of the data areas 210 and 210a includes a plurality of segments, each of which includes a plurality of chunks. When access designating a physical address is made by the I/O server 100, data is written to or read from the data area 210/210a. In case the I/O server 100 loses information stored in the table storing unit 110 due to its failure, the I/O server 100 backs up at least the initialization bitmap stored in the table storing unit 110 to the management area 220.

The access server 300 includes an access unit 310. The access unit 310 is implemented, for example, as a program module. When a virtual machine issues an access request, the access unit 310 transfers the access request to an I/O server in charge of a logical disk allocated to the virtual machine (the I/O server 100 in this case). The correspondence between the logical disk and the I/O server is notified of by the management server 400 when the logical disk is made recognizable by the virtual machine (i.e., when the logical disk is connected to the virtual machine).

The management server 400 includes a table storing unit 410, a VDISK managing unit 420, and an initialization control unit 430. The table storing unit 410 is implemented, for example, using part of the storage area of RAM or a HDD. The VDISK managing unit 420 and the initialization control unit 430 are implemented, for example, as program modules.

The table storing unit 410 stores therein a segment table indicating a segment state and usage of each segment. The segment usage indicates whether the segment is in use to constitute a logical disk. In addition, the table storing unit 410 stores a VDISK management table indicating the correspondence between logical disks and I/O servers.

The VDISK managing unit 420 creates a logical disk by referring to the segment table stored in the table storing unit 410, according to a command input to the management server 400 by a user or the administrator. In addition, the VDISK managing unit 420 connects the created logical disk to a virtual machine according to a command. In this regard, the VDISK managing unit 420 selects an I/O server in charge of the logical disk (the I/O server 100 in this case), and notifies the selected I/O server and the access server 300 of the selected I/O server. In addition, the VDISK managing unit 420 deletes a logical disk according to a command to thereby release segment allocation.

The initialization control unit 430 controls background initialization. The initialization control unit 430 monitors the segment table stored in the table storing unit 410, then selects an uninitialized segment in TZERO or TZERO+ state, and transmits an initialization request to the I/O server 100/100a. In this regard, the initialization control unit 430 preferentially selects an allocated segment in TZERO+ state over an unallocated segment in TZERO state. The initialization of a segment in TZERO state may be requested from any I/O server. On the other hand, the initialization of a segment in TZERO+ state is requested from an I/O server in charge of a logical disk including the segment.

FIG. 7 illustrates an example of a segment table. A segment table 411 of FIG. 7 is stored in the table storing unit 410 of the management server 400. The segment table 411 includes columns named Segment ID, Storage, State, and VDISK.

In Segment ID column, each field contains an identifier of a segment. In Storage column, each field contains the identifier of a physical disk including a corresponding segment. In State column, each field contains one of FREE, VALID, TZERO, and TZERO+, which indicates the state of a corresponding segment. In VDISK column, each field contains the identifier of a logical disk including a corresponding segment. In VDISK column, no identifiers of logical disks are set for segments whose state is either FREE or TZERO. The VDISK managing unit 420 updates information in State and VDISK columns, and the initialization control unit 430 updates information in State column.

Figure 8:
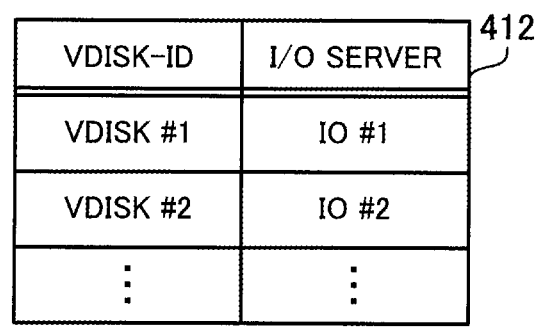
FIG. 8 illustrates an example of a VDISK management table.

FIG. 8 illustrates an example of a VDISK management table. A VDISK management table 412 of FIG. 8 is stored in the table storing unit 410 of the management server 400. The VDISK management table 412 includes columns named VDISK-ID and I/O Server.

In VDISK-ID column, each field contains an identifier of a logical disk. In I/O Server column, each field contains the identifier of an I/O server (for example, a host name or an Internet Protocol (IP) address of the I/O server) in charge of a corresponding logical disk. When a logical disk is connected to a virtual machine and when a logical disk is deleted, the VDISK managing unit 420 updates information in VDISK-ID and I/O Server columns.

Figure 9:
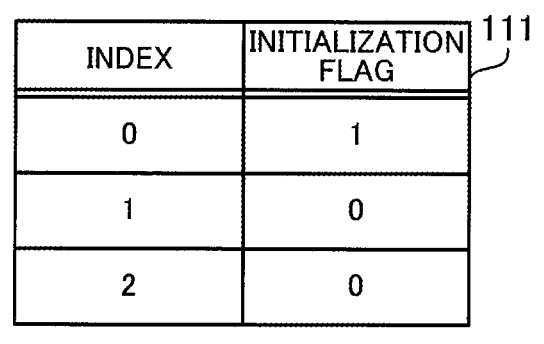

FIG. 9 illustrates an example of a segment state table. A segment state table 111 of FIG. 9 is stored in the table storing unit 110 of the I/O server 100. One segment state table corresponds to one logical disk. The segment state table 111 is created in the table storing unit 110 in response to an instruction issued from the management server 400 when a logical disk is connected to a virtual machine. The segment state table 111 includes columns named Index and Initialization Flag.

In Index column, each field contains an identifier of a segment in the logical disk. For example, segments of the logical disk are given indexes of non-negative integers, for example, 0, 1, 2, and so on, in ascending order of logical addresses. In Initialization Flag column, each field contains information indicating whether initialization of a corresponding segment has been completed. For example, a value of 0 indicates that the initialization has not been completed while a value of 1 indicates that the initialization has been completed. When the initialization of a segment is completed, the initialization executing unit 130 updates corresponding information in Initialization Flag column.

Note that the segment state table 111 of FIG. 9 provides information of both initialized segments and uninitialized segments, however, a segment state table may be a list containing only one of either uninitialized segments or initialized segments.

FIG. 10 illustrates an example of a chunk management bitmap. A chunk management bitmap 112 of FIG. 10 is stored in the table storing unit 110 of the I/O server 100. One chunk management bitmap corresponds to one uninitialized segment. The chunk management bitmap 112 is created in the table storing unit 110 in response to an instruction issued from the management server 400 when a logical disk is connected to a virtual machine. The chunk management bitmap 112 includes an exclusion bitmap and an initialization bitmap.

The exclusion bitmap includes a plurality of exclusion bits corresponding one-to-one with chunks. The exclusion bits are arranged in ascending order of Chunk IDs which are identifiers of chunks in the segment. For example, in the case where one segment includes 256 chunks, the exclusion bitmap is represented by 256 bits. As for each exclusion bit, a value of 0 indicates that a corresponding chunk is not in operation, and a value of 1 indicates that a corresponding chunk is in operation. When access is made to a chunk in response to an access request, the I/O converting unit 120 sets an exclusion bit of the chunk to 1. On the other hand, when a chunk is initialized in the background, not in response to an access request, the initialization executing unit 130 sets an exclusion bit of the chunk to 1.

The initialization bitmap includes a plurality of initialization bits corresponding one-to-one with chunks. The initialization bits are arranged in ascending order of Chunk IDs. For example, in the case where one segment includes 256 chunks, the initialization bitmap is represented by 256 bits. As for each initialization bit, a value of 0 indicates that a corresponding chunk is uninitialized, and a value of 1 indicates that a corresponding chunk is initialized. When a chunk is initialized, the I/O converting unit 120 or the initialization executing unit 130 updates an initialization bit of the chunk.

Note that the initialization bitmap is backed up to the management area 220 of the storage apparatus 200*a*. In addition, when all the chunks in a segment are initialized (for example, all the initialization bits are set to 1) and thus the initialization of the segment is completed, the exclusion bitmap and initialization bitmap of the segment may be deleted. The chunk management bitmap 112 may be created in a table format.

Figure 11:
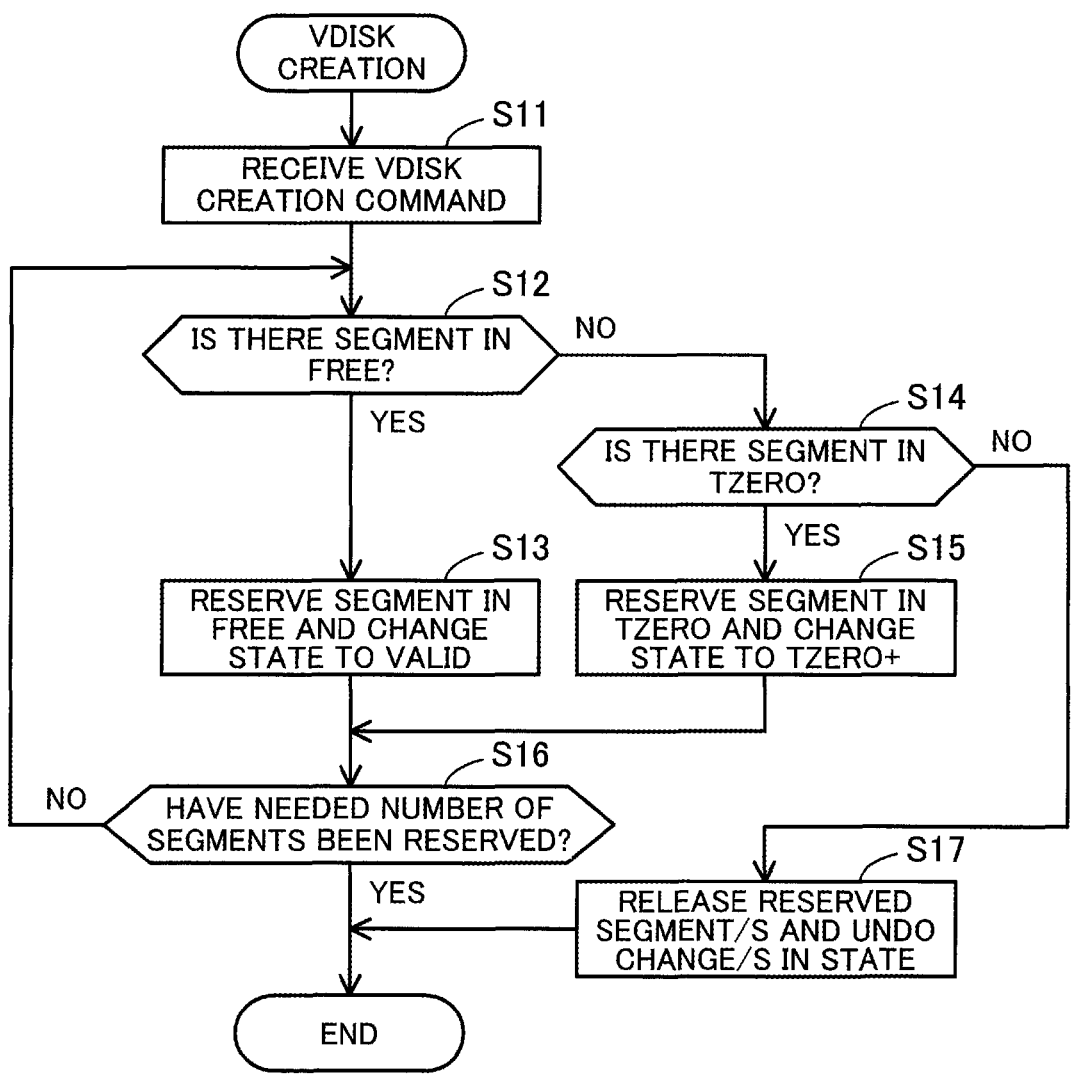
FIG. 11 is a flowchart illustrating an example of a procedure for VDISK creation.

FIG. 11 is a flowchart illustrating an example of a procedure for VDISK creation. The procedure of FIG. 11 is executed when the management server 400 receives a VDISK creation command.

(Step S11) The VDISK managing unit 420 receives a VDISK creation command input by a user of a virtual machine or the administrator of the storage system. The VDISK creation command designates the number of segments desired by the user to be allocated. The VDISK managing unit 420 assigns an identifier (VDISK-ID) to a logical disk to be newly created.

(Step S12) The VDISK managing unit 420 searches the segment table 411 stored in the table storing unit 410 to determine whether there is a segment in FREE state (i.e., an unallocated and initialized segment). If there is a segment in FREE state, the VDISK managing unit 420 moves the procedure to step S13. If not, the VDISK managing unit 420 moves the procedure to step S14.

(Step S13) The VDISK managing unit 420 reserves one segment in FREE state for the virtual machine and, then, updates the state of the segment registered in the segment table 411 from FREE to VALID. In addition, the VDISK managing unit 420 registers the identifier of the logical disk in the segment table 411. Subsequently, the VDISK managing unit 420 moves the procedure to step S16.

(Step S14) The VDISK managing unit 420 searches the segment table 411 to determine whether there is a segment in TZERO state (i.e., an unallocated and uninitialized segment). If there is a segment in TZERO state, the VDISK managing unit 420 moves the procedure to step S15. If not, the VDISK managing unit 420 moves the procedure to step S17.

(Step S15) The VDISK managing unit 420 reserves one segment in TZERO state for the virtual machine and, then, updates the state of the segment registered in the segment table 411 from TZERO to TZERO+. In addition, the VDISK managing unit 420 registers the identifier of the logical disk in the segment table 411.

(Step S16) The VDISK managing unit 420 determines whether segments as many as designated by the VDISK creation command have been reserved. If the needed number of segments have been reserved, the VDISK managing unit 420 ends the procedure. If not, the VDISK managing unit 420 moves the procedure to step S12.

(Step S17) The VDISK managing unit 420 undoes the updates made to the states of the individual segments reserved in steps S13 and S15, to thereby roll back the procedure carried out to this point. In this regard, the VDISK managing unit 420 updates the states registered in the segment table 411 and deletes the identifier of the logical disk defined in step S11 from the segment table 411. Note that, in case of rollback, the VDISK managing unit 420 holds, for example, the update history of information in the State column of the segment table 411 until segments are decided for the logical disk.

Figure 12:
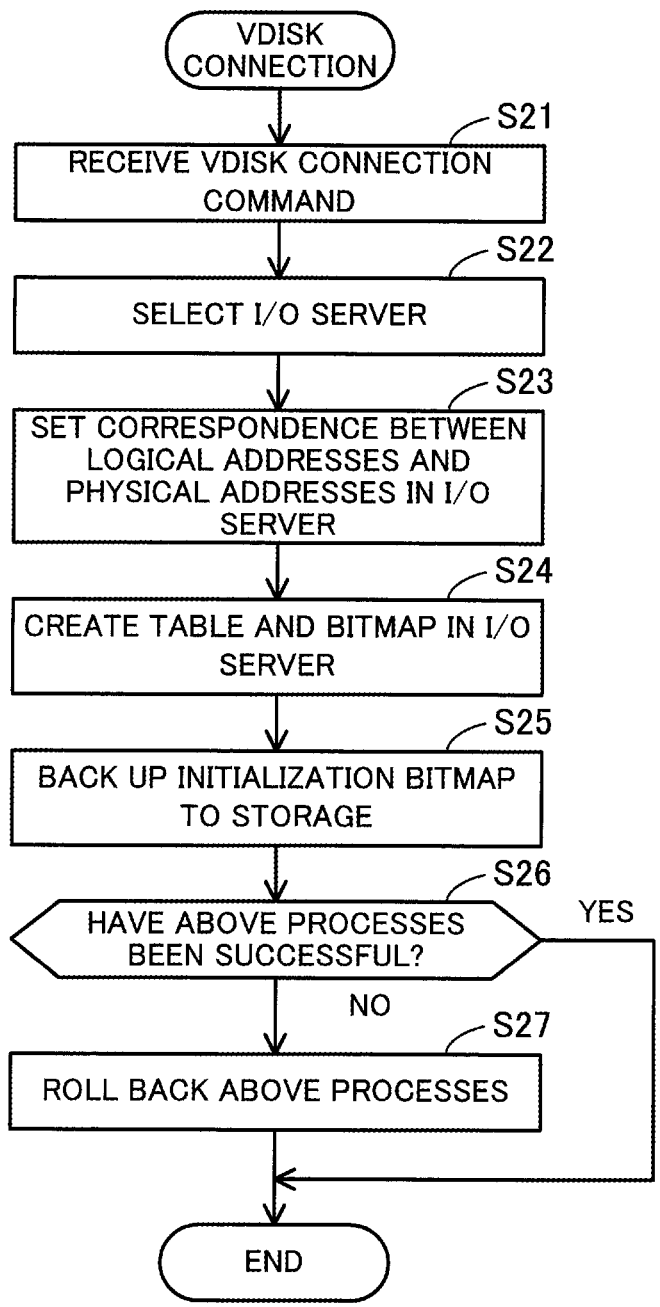
FIG. 12 is a flowchart illustrating an example of a procedure for VDISK connection.

FIG. 12 is a flowchart illustrating an example of a procedure for VDISK connection. The procedure of FIG. 12 is executed when the management server 400 receives a VDISK connection command.

(Step S21) The VDISK managing unit 420 receives a VDISK connection command input by a user of a virtual machine or the administrator of the storage system. The VDISK connection command designates the identifier of a created logical disk.

(Step S22) The VDISK managing unit 420 selects, amongst the I/O servers 100 and 100*a*, an I/O server to be in charge of the designated logical disk. The selection of an I/O server here is made in such a manner that the access load is preferably balanced between the I/O servers 100 and 100*a*. Possible approaches in this regard include, for example, selecting an I/O server different from the previously selected one in round-robin fashion; selecting an I/O server currently in charge of the least number of logical disks with reference to the VDISK management table 412; and making inquiries to the I/O servers 100 and 100*a* about the current access load to select an appropriate I/O server. Assume here that the I/O server 100 is selected.

(Step S23) The VDISK managing unit 420 sets the correspondence between logical addresses and physical addresses in the I/O converting unit 120 of the I/O server 100 selected in step S22. The beginning of the logical disk is assigned a predetermined logical address value (for example, '0'), and logical address values assigned to segments of the logical disk progressively increase from the first to the last segments. In a single logical disk, logical addresses correspond one-to-one with physical addresses. The correspondence between the logical addresses and the physical addresses is determined, for example, by designating the sequence of the segments.

(Step S24) The VDISK managing unit 420 notifies the I/O server 100 of whether the initialization of each segment belonging to the logical disk has been completed. Based on the notification, the I/O server 100 generates the segment state table 111, which is then stored in the table storing unit 110. In addition, for each segment whose initialization has not been completed, the I/O server 100 generates the chunk management bitmap 112, which is then stored in the table storing unit 110. At this point in time, all bits in the exclusion bitmap and the initialization bitmap are set to 0.

(Step S25) The I/O server 100 backs up the initialization bitmap of the chunk management bitmap 112 generated in step S24 by copying the initialization bitmap to the management area 220 of the storage apparatus 200a. Note that the I/O server 100 may also back up the segment state table 111 in addition to the initialization bitmap, or may back up the entire chunk management bitmap 112. The I/O server 100 reports to the management server 400 on whether the processes of steps S23 to S25 have been successful.

(Step S26) Based on the response from the I/O server 100, the VDISK managing unit 420 determines whether the setup of the I/O server 100 selected in step S22 has been successful. If the setup has been successful, the VDISK managing unit 420 registers the association between the logical disk and the I/O server 100 in the VDISK management table 412 stored in the table storing unit 410, and then notifies the access server 300 of the assignment of the I/O server 100. Subsequently, the VDISK managing unit 420 ends the procedure. If the setup is failed, the VDISK managing unit 420 moves the procedure to step S27.

(Step S27) The VDISK managing unit 420 rolls back the processes of steps S23 to S25. At this point in time, for example, the VDISK managing unit 420 instructs the I/O server 100 to erase the correspondence between the logical addresses and the physical addresses from the I/O converting unit 120 and also delete the segment state table 111 and the chunk management bitmap 112.

Note that the created logical disk may be repeatedly disconnected from and reconnected to a virtual machine. This allows the logical disk to be switched between being recognizable and unrecognizable by the virtual machine. According to the procedure examples of FIGS. 11 and 12, the I/O server assignment and the creation of the segment state table 111 and the chunk management bitmap 112 are carried out when the logical disk is connected, however, these processes may be carried out when the logical disk is created instead.

Figure 13:
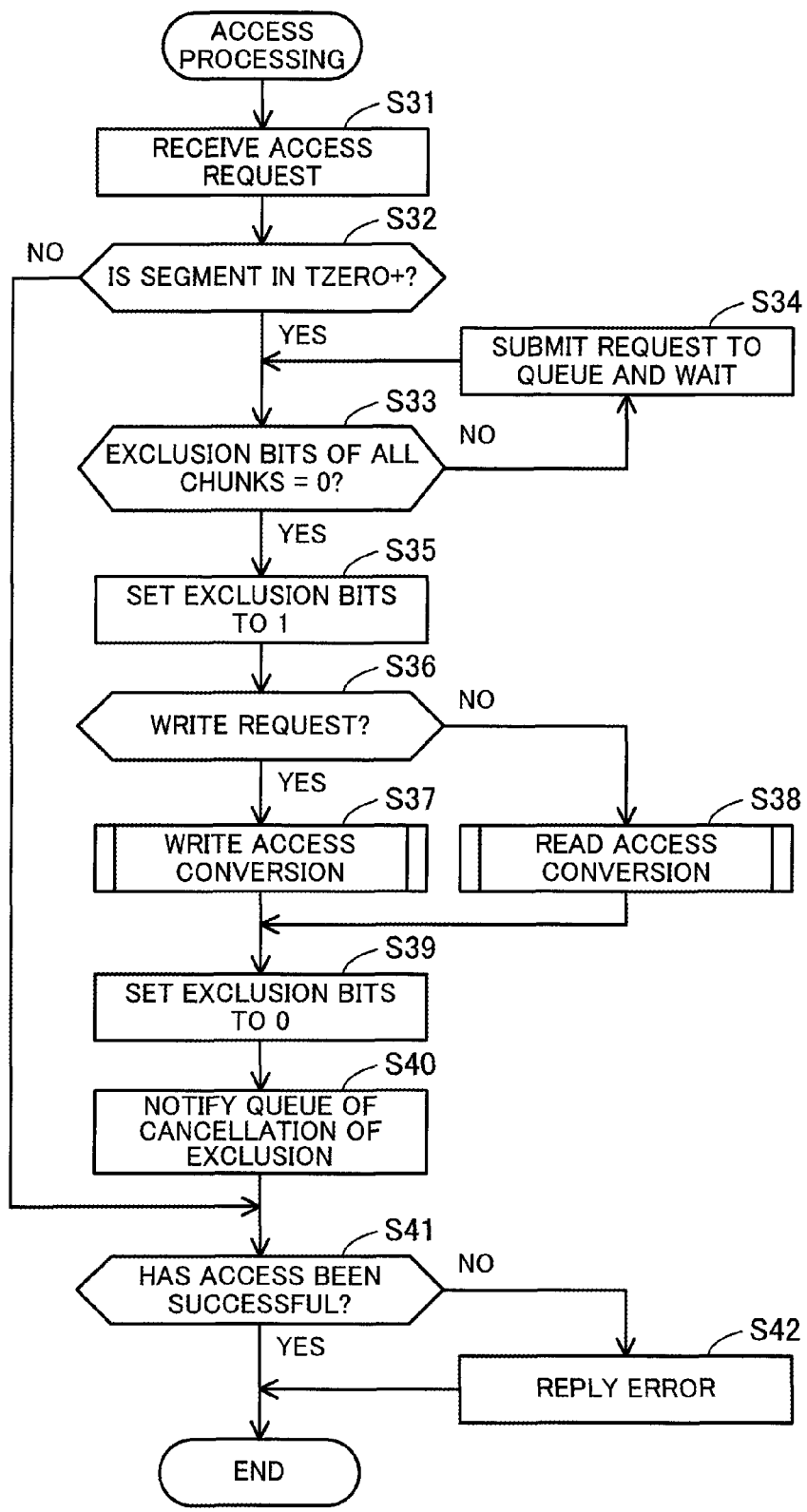
FIG. 13 is a flowchart illustrating an example of a procedure for access processing.

FIG. 13 is a flowchart illustrating an example of a procedure for access processing. The procedure of FIG. 13 is executed when the I/O server 100 receives an access request from the access server 300. A similar procedure may also take place in the I/O server 100a. Assume here that access is made to a segment in the storage apparatus 200.

(Step S31) The I/O converting unit 120 receives an access request issued by a virtual machine from the access server 300. There are two types of access request, write requests to write data and read requests to read data. Each access request designates a storage area to be accessed using, for example, a logical address of the beginning of the storage area and the length of the storage area.

(Step S32) The I/O converting unit 120 identifies a segment to which the storage area designated by the access request belongs, and determines whether the state of the segment is TZERO+ with reference to the segment state table 111 stored in the table storing unit 110. If the state of the segment is TZERO+, the I/O converting unit 120 moves the procedure to step S33. If the state of the segment is not TZERO+ (i.e., VALID), the I/O converting unit 120 converts the logical address into a physical address and transmits a normal command according to the access request to the storage apparatus 200, and then moves the procedure to the step S41.

(Step S33) The I/O converting unit 120 identifies one or more chunks each including at least part of the storage area designated by the access request. Then, with reference to the chunk management bitmap 112 stored in the table storing unit 110, the I/O converting unit 120 determines whether exclusion bits of all the identified chunks, from the first to the last one, are set to 0 (i.e., whether a chunk in operation is absent). If there is no chunk in operation, the I/O converting unit 120 moves the procedure to step S35. If there is at least one chunk in operation, the I/O converting unit 120 moves the procedure to step S34.

(Step S34) The I/O converting unit 120 submits the access request received in step S31 to a data access queue, and waits until the exclusion bits of all the chunks to be accessed are set to 0 (i.e., until access prohibition is lifted). Subsequently, the I/O converting unit 120 moves the procedure to step S33. Note that the data access queue is created, for example, in the RAM 102.

(Step S35) The I/O converting unit 120 sets, in the chunk management bitmap 112, the exclusion bits of all the chunks to be accessed to 1.

(Step S36) The I/O converting unit 120 determines whether the access request received in step S31 is a write request. If it is a write request, the I/O converting unit 120 moves the procedure to step S37. If it is not a write request (i.e., read request), the I/O converting unit 120 moves the procedure to step S38.

(Step S37) The I/O converting unit 120 converts the logical address into a physical address, and transmits, to the storage apparatus 200, a write command to write data to the storage area designated by the access request. In this regard, the I/O converting unit 120 may initialize areas other than the storage area for the data write so that the entire storage area of each of the chunks to be accessed is initialized. The conversion from the access request to the write command is described in detail later.

(Step S38) The I/O converting unit 120 converts the logical address into a physical address, and transmits, to the storage apparatus 200, a read command to read data from the storage area designated by the access request. In this regard, the I/O converting unit 120 initializes the storage area of the chunks to be accessed so that the entire storage area of each of the chunks is initialized. The conversion from the access request to the read command is described in detail later.

(Step S39) As for the chunk management bitmap 112, the I/O converting unit 120 changes the exclusion bit of each of all the chunks, to which access has been completed, back to 0.

(Step S40) The I/O converting unit 120 notifies the data access queue of the presence of the chunks whose exclusion bit has been changed from 1 to 0 (i.e., whose access prohibition has been lifted). Herewith, an access request stored in the queue and waiting to be processed may be processed.

(Step S41) The I/O converting unit 120 determines whether the write access in step S37 or the read access in step S38 has been successful. If the access has been successful, the I/O converting unit 120 reports the successful write access or returns read data to the access server 300 having issued the access request, and then ends the procedure. If the access has failed, the I/O converting unit 120 moves the procedure to step S42.

(Step S42) The I/O converting unit 120 reports the failed write or read access to the access server 300 having issued the access request, and then ends the procedure. In this regard, the I/O converting unit 120 may notify the access server 300 of a cause of the failed access.

Figure 14:
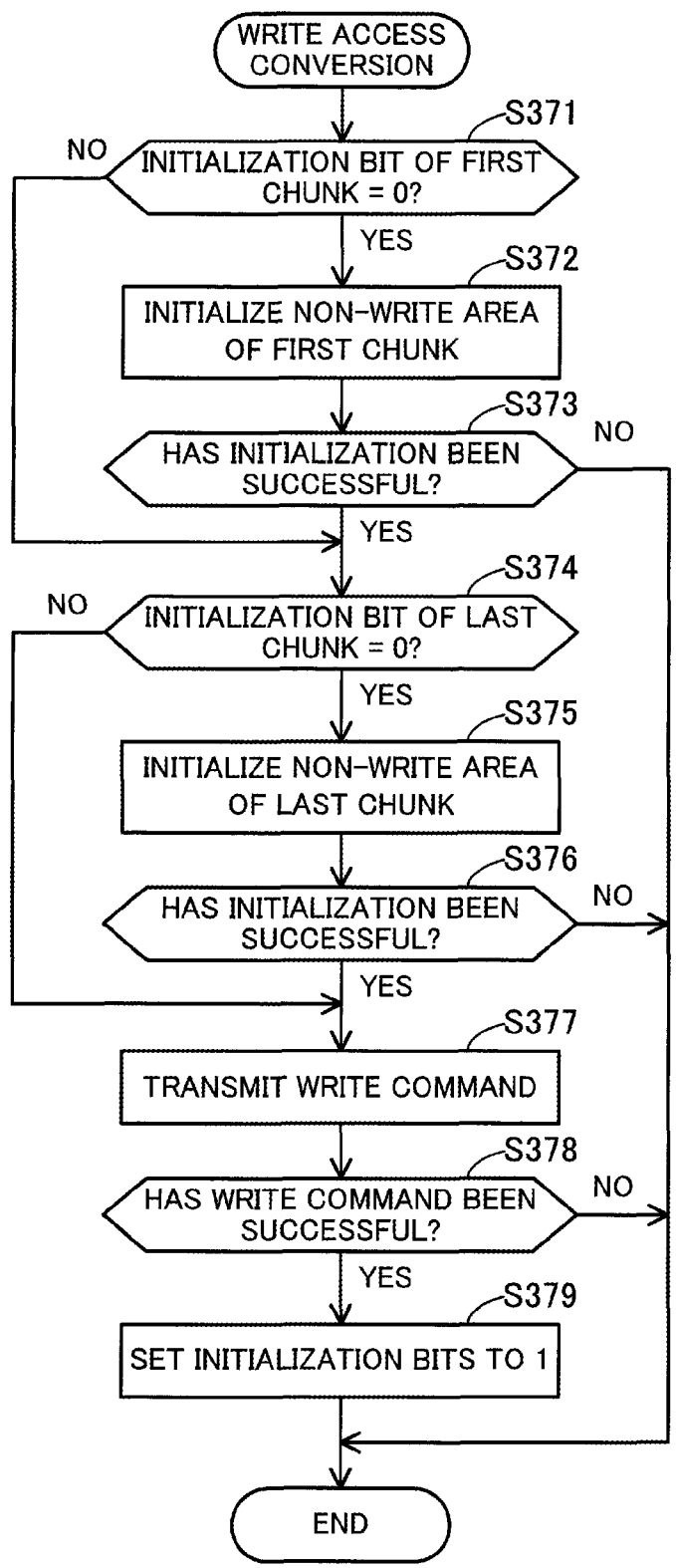
FIG. 14 is a flowchart illustrating an example of a procedure for write access conversion.

FIG. 14 is a flowchart illustrating an example of a procedure for write access conversion. The procedure of FIG. 14 is executed in step S37 in the flowchart of FIG. 13.

(Step S371) With reference to the chunk management bitmap 112 stored in the table storing unit 110, the I/O converting unit 120 determines whether the initialization bit of the first chunk is 0 (i.e., whether the first chunk is uninitialized). If it is uninitialized, the I/O converting unit 120 moves the procedure to step S372. If it is already initialized, the I/O converting unit 120 moves the procedure to step S374.

(Step S372) As for the first chunk, the I/O converting unit 120 calculates a storage area not designated for the data write (non-write area) in the entire storage area of the first chunk, and initializes the calculated storage area. For example, the I/O converting unit 120 transmits, to the storage apparatus 200, a command to write a predetermined bit sequence (all 0's, for example) to the calculated storage area. In this regard, a storage area for the data write (write area) needs not to be initialized.

(Step S373) The I/O converting unit 120 determines whether the initialization in step S372 has been successful. If it has been successful (for example, if the I/O converting unit 120 has received a reply indicating success in the initialization from the storage apparatus 200), the I/O converting unit 120 moves the procedure to step S374. If it has failed (for example, if the I/O converting unit 120 has received an error reply from the storage apparatus 200), the I/O converting unit 120 cancels the conversion of the access request to a write command.

(Step S374) With reference to the chunk management bitmap 112 stored in the table storing unit 110, the I/O converting unit 120 determines whether the initialization bit of the last chunk is 0 (i.e., whether the last chunk is uninitialized). If it is uninitialized, the I/O converting unit 120 moves the procedure to step S375. If it has already been initialized, the I/O converting unit 120 moves the procedure to step S377.

(Step S375) As for the last chunk, the I/O converting unit 120 calculates a storage area not designated for the data write (non-write area) in the entire storage area of the last chunk, and initializes the calculated storage area. For example, the I/O converting unit 120 transmits, to the storage apparatus 200, a command to write a predetermined bit sequence (all 0's, for example) to the calculated storage area. In this regard, a storage area for the data write (write area) needs not to be initialized.

(Step S376) The I/O converting unit 120 determines whether the initialization in step S375 has been successful. If it has been successful (for example, if the I/O converting unit 120 has received a reply indicating success in the initialization from the storage apparatus 200), the I/O converting unit 120 moves the procedure to step S377. If it has failed (for example, if the I/O converting unit 120 has received an error reply from the storage apparatus 200), the I/O converting unit 120 cancels the conversion of the access request to a write command.

(Step S377) The I/O converting unit 120 converts the logical address to a physical address and transmits a write command according to the access request to the storage apparatus 200. Note that, prior to step S371 above, the logical address may be converted to a physical address, based on which the identification of chunks and the calculation of storage areas to be initialized are carried out.

(Step S378) The I/O converting unit 120 determines whether to have received, from the storage apparatus 200, a reply of successful write access in response to the write command of step S377. If the write access has been successful, the I/O converting unit 120 moves the procedure to step S379. If not, the I/O converting unit 120 ends the procedure.

(Step S379) As for the chunk management bitmap 112, the I/O converting unit 120 changes the exclusion bit of each of all the chunks to which access has been completed to 1. In addition, the I/O converting unit 120 updates the initialization bitmap backed up in the management area 220 of the storage apparatus 200a. This eliminates the need for the chunks to be initialized by the background initialization process. Note that steps S371 to S373, steps S374 to S376, and steps S377 and S378 above may be executed in no particular order, or in parallel.

Figure 15:
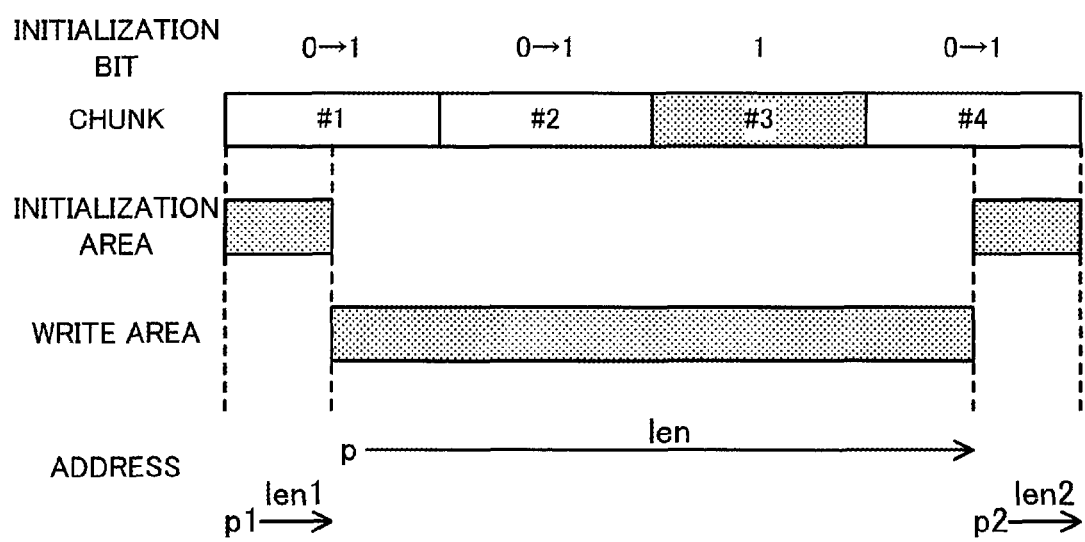
FIG. 15 illustrates an example of a write process performed on a storage apparatus.

FIG. 15 illustrates an example of a write process performed on a storage apparatus. Assume here that a write area for data write spans four chunks (Chunks #1 to #4) and Chunks #1, #2, and #4 are uninitialized while Chunk #3 is already initialized. In this case, a non-write area (in which no data write takes place) within the first chunk to be accessed, Chunk #1, is initialized and a non-write area within the last chunk to be accessed, Chunk #4, is initialized. As for a write area, initialization is not needed and data only has to be directly written thereto. With the write command, the storage apparatus 200 is notified, for example, of a physical address corresponding to the beginning logical address designated by the access request and the length designated by the access request. Herewith, Chunks #1, #2, and #4 having been uninitialized become initialized.

The non-write area in the first chunk is calculated, for example, by the following procedure. Here, the beginning address (offset) of the segment is denoted as s, the length of each chunk is denoted as c, the beginning address of the write area is denoted as p, and the length of the write area is denoted as len. First, a beginning address p1 of the first chunk is calculated by: $p1=s+(p-s)/c*c$. As for the result of the division, any numbers after the decimal point are rounded off. Then, a length len1 of the non-write area in the first chunk is calculated by: $len1=p-p1$. For the initialization of the beginning non-write area, a command, for example, including the calculated p1 and len1 is transmitted from the I/O server 100 to the storage apparatus 200.

In addition, the non-write area in the last chunk is calculated, for example, by the following procedure. First, a beginning address p2 of the latter non-write area (i.e., an address indicating a location following the end of the write area) is calculated by: $p2=p+len$. Then, a length len2 of the latter non-write area is calculated by: $len2=s+\{p2+(c-1)-s\}/c*c-p2$. For the initialization of the latter non-write area, a command, for example, including the calculated p2 and len2 is transmitted from the I/O server 100 to the storage apparatus 200.

Figure 16:
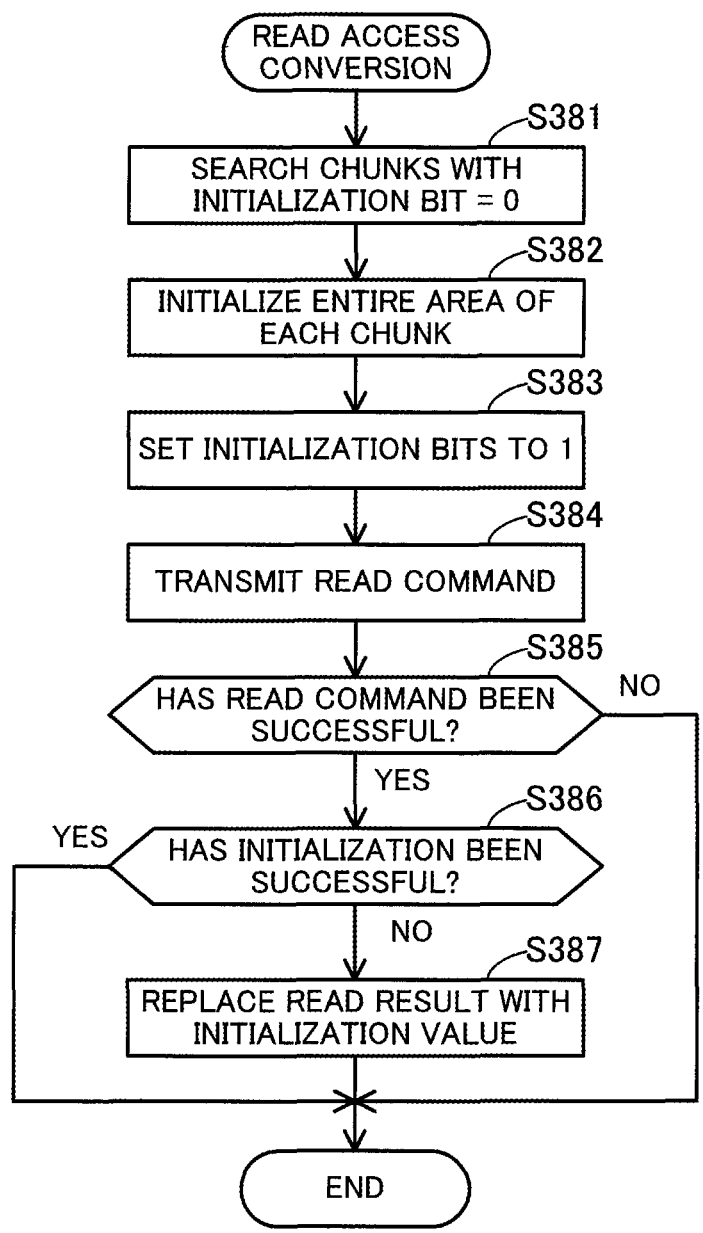
FIG. 16 is a flowchart illustrating an example of a procedure for read access conversion.

FIG. 16 is a flowchart illustrating an example of a procedure for read access conversion. The procedure of FIG. 16 is executed in step S38 in the flowchart of FIG. 13.

(Step S381) With reference to the chunk management bitmap 112 stored in the table storing unit 110, the I/O converting unit 120 searches the chunks to be accessed for chunks whose initialization bit is 0 (i.e., uninitialized chunks).

(Step S382) The I/O converting unit 120 initializes the entire storage area of each of the chunks found by the search in step S381. For example, the I/O converting unit 120 transmits, to the storage apparatus 200, a command to write a predetermined bit sequence (all 0's, for example) to each of the found chunks. The command designates, for example, the beginning address of each of the chunks and the chunk size.

(Step S383) The I/O converting unit 120 sets, in the chunk management bitmap 112, the initialization bit of each of the initialized chunks to 1, and also updates the initialization bitmap backed up in the management area 220 of the storage apparatus 200a. This eliminates the need for the chunks to be initialized by the background initialization process.

(Step S384) The I/O converting unit 120 converts the logical address to a physical address and transmits a read command according to the access request to the storage apparatus 200. Note that, prior to step S381 above, the logical address may be converted to a physical address, based on which the identification of chunks and the calculation of storage areas to be initialized are carried out.

(Step S385) The I/O converting unit 120 determines whether to have normally received, from the storage apparatus 200, read data in response to the read command of step S384. If the read access has been successful, the I/O converting unit 120 moves the procedure to step S386. If not, the I/O converting unit 120 ends the procedure.

(Step S386) The I/O converting unit 120 determines whether the initialization of all the chunks in step S382 has been successful. If the initialization of all the chunks has been successful, the I/O converting unit 120 ends the procedure. If the initialization of at least one of the chunks has failed, the I/O converting unit 120 moves the procedure to step S387.

(Step S387) The I/O converting unit 120 replaces the data read from the chunk whose initialization has failed with a predetermined bit sequence (all 0's, for example) serving as an initialization value, and discards the replaced data. The data replacement is implemented, for example, by overwriting an area, within the RAM 102, for storing data to be returned to the access server 300 with the initialization value. This prevents data before initialization from being mistakenly transmitted to the access server 300. Note that according to the procedure example of FIG. 16, uninitialized chunks are first initialized and, then, data is read from the initialized chunks. However, the data read may be skipped and the initialization value stored in the chunks immediately after the initialization may be prepared in the RAM 102 as data to be transmitted to the access server 300.

Figure 17:
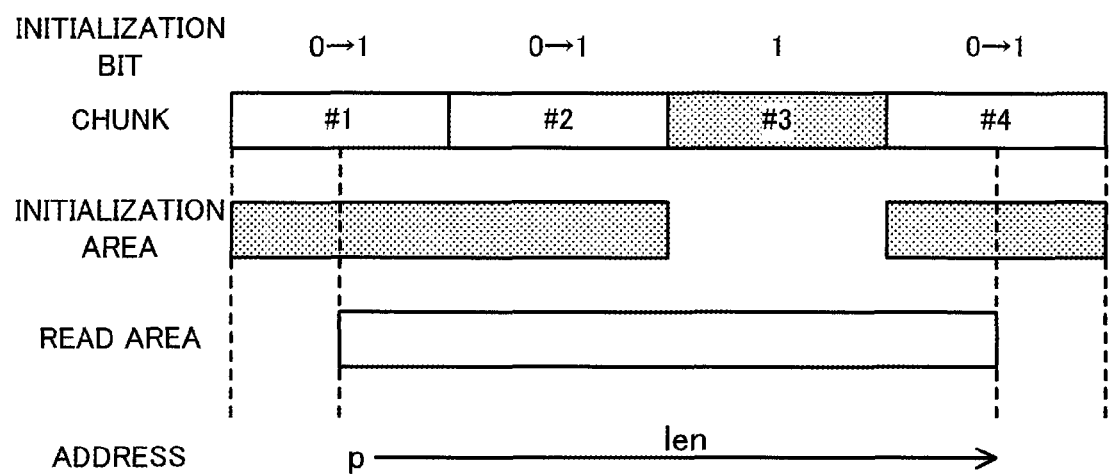
FIG. 17 illustrates an example of a read process performed on the storage apparatus.

FIG. 17 illustrates an example of a read process performed on a storage apparatus. Assume here that a storage area from which data is read (read area) spans four chunks (Chunks #1 to #4) and Chunks #1, #2, and #4 are uninitialized while Chunk #3 is already initialized, as in the case of FIG. 15. In this case, the entire storage area of each of the uninitialized chunks to be accessed, Chunks #1, #2, and #4, is initialized regardless of the actual read area. With the read command, the storage area 200 is notified, for example, of a physical address corresponding to the beginning logical address designated by the access request and the length designated by the access request. Herewith, Chunks #1, #2, and #4 having been uninitialized become initialized.

Figure 18:
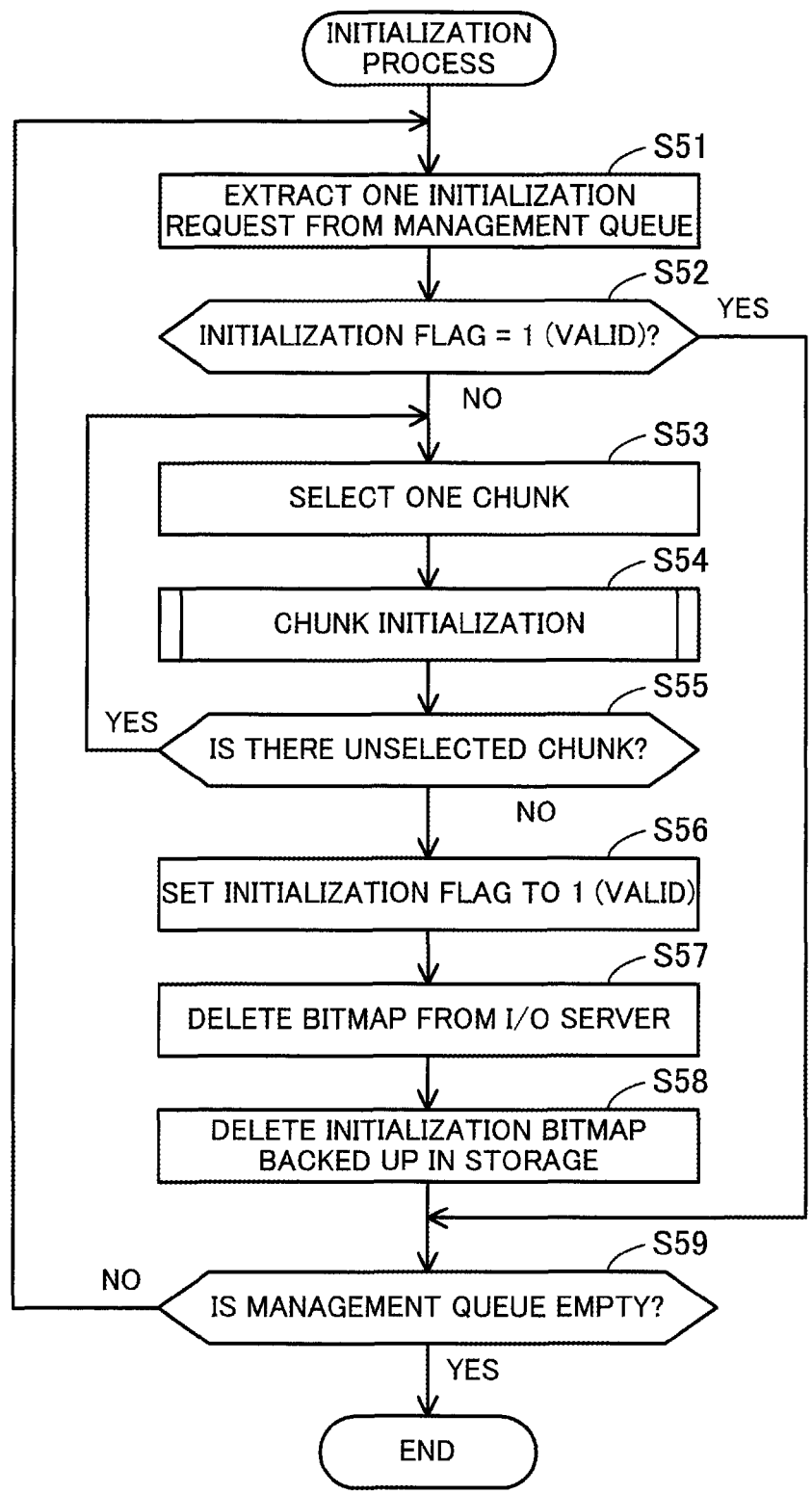
FIG. 18 is a flowchart illustrating an example of a procedure for an initialization process.

FIG. 18 is a flowchart illustrating an example of a procedure for an initialization process. The procedure of FIG. 18 is repeatedly executed periodically or irregularly by the I/O server 100. A similar procedure may also take place in the I/O server 100a. Assume the case of initializing segments in the storage apparatus 200 in the background.

(Step S51) Initialization requests received from the management server 400 are stored in a management queue of the I/O server 100. The management queue is crated, for example, in the RAM 102. The initialization executing unit 130 extracts one initialization request from the queue. Each initialization request designates one segment to be initialized.

(Step S52) With reference to the segment state table 111 stored in the table storing unit 110, the initialization executing unit 130 determines whether the initialization flag of the segment designated by the initialization request is 1 (i.e., whether the state of the segment is already VALID). If the state is VALID, the initialization executing unit 130 moves the procedure to step S59. If the state is TZERO+, the initialization executing unit 130 moves the procedure to step S53.

(Step S53) The initialization executing unit 130 selects one chunk included in the designated segment. For example, the initialization executing unit 130 selects a chunk in ascending order of CHUNK IDs.

(Step S54) The initialization executing unit 130 causes the chunk selected in step S53 to be initialized. The chunk initialization is described in detail later.

(Step S55) The initialization executing unit 130 determines whether the designated segment includes a chunk not yet selected in step S53. If there is an unselected chunk, the initialization executing unit 130 moves the procedure to step S53. If all the chunks in the designated segment have already been selected, the initialization executing unit 130 moves the procedure to step S56.

(Step S56) The initialization executing unit 130 sets, in the segment state table 111, the initialization flag of the designated segment to 1 (VALID). In addition, the initialization executing unit 130 notifies the management server 400 of the completion of the initialization of the designated segment. Herewith, the state of the segment is set to VALID also in the segment table 411 stored in the tables storing unit 410.

(Step S57) The initialization executing unit 130 deletes, from the table storing unit 110, the chunk management bitmap 112 of the segment whose initialization has been completed.

(Step S58) The initialization executing unit 130 deletes the initialization bitmap backed up in the management area 220 of the storage apparatus 200a. Note that steps S56 to S58 may be executed in no particular order, or in parallel.

(Step S59) The initialization executing unit 130 determines whether the management queue is empty. If the management queue is empty, the initialization executing unit 130 ends the procedure. If an initialization request remains in the management queue, the initialization executing unit 130 moves the procedure to step S51 to process the next initialization request.

Figure 19:
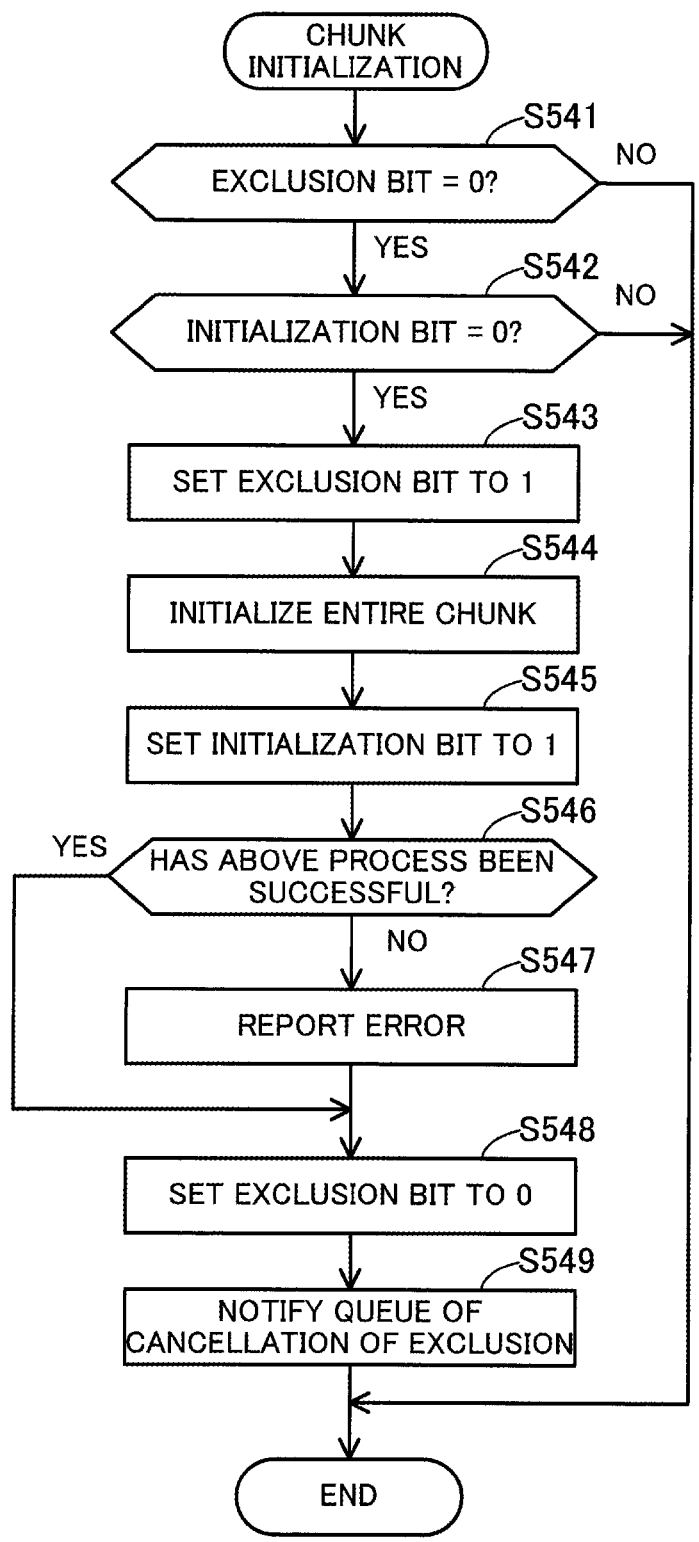
FIG. 19 is a flowchart illustrating an example of a procedure for chunk initialization.

FIG. 19 is a flowchart illustrating an example of a procedure for chunk initialization. The procedure of FIG. 19 is executed in step S54 in the flowchart of FIG. 18.

(Step S541) With reference to the chunk management bitmap 112 stored in the table storing unit 110, the initialization executing unit 130 determines whether the exclusion bit of the selected chunk is 0 (i.e., whether access to the chunk is unprohibited). If the exclusion bit is 0, the initialization executing unit 130 moves the procedure to step S542. If the exclusion bit is 1, the initialization executing unit 130 ends the procedure. Note that a chunk with the exclusion bit being 1 at this point is to be initialized by the I/O converting unit 120.

(Step S542) With reference to the chunk management bitmap 112, the initialization executing unit 130 determines whether the initialization bit of the selected chunk is 0 (i.e., whether the chunk is uninitialized). If the initialization bit is 0, the initialization executing unit 130 moves the procedure to step S543. If the initialization bit is 1, the initialization executing unit 130 ends the procedure because the selected chunk has already been initialized.

(Step S543) The initialization executing unit 130 sets, in the chunk management bitmap 112, the exclusion bit of the chunk to 1, to thereby prohibit the I/O converting unit 120 from accessing the chunk.

(Step S544) The initialization executing unit 130 initializes the entire storage area of the selected chunk. For example, the initialization executing unit 130 transmits, to the storage apparatus 200, a command to write a predetermined bit sequence (all 0's, for example) to the entire chunk, from the beginning to the end thereof. The command designates, for example, a beginning address of the chunk and its chunk size.

(Step S545) The initialization executing unit 130 sets, in the chunk management bitmap 112, the initialization bit of the initialized chunk to 1, and also updates the initialization bitmap backed up in the management area 220 of the storage apparatus 200a.

(Step S546) The initialization executing unit 130 determines whether the initialization in step S544 has been successful. If the initialization has been successful (for example, if the initialization executing unit 130 has received a reply indicating success in the initialization from the storage apparatus 200), the initialization executing unit 130 moves the procedure to step S548. If the initialization has failed (for example, if the initialization executing unit 130 has received an error reply from the storage apparatus 200), the initialization executing unit 130 moves the procedure to step S547.

(Step S547) The initialization executing unit 130 reports the error to the management server 400.

(Step S548) The initialization executing unit 130 sets, in the chunk management bitmap 112, the exclusion bit of the chunk to 0 to thereby lift the prohibition for the I/O converting unit 120 to access the chunk.

(Step S549) The initialization executing unit 130 notifies the data access queue of the presence of a chunk whose exclusion bit has been changed from 1 to 0 (i.e., whose access prohibition has been lifted). Herewith, an access request stored in the queue and waiting to be processed may be processed.

Figure 20:
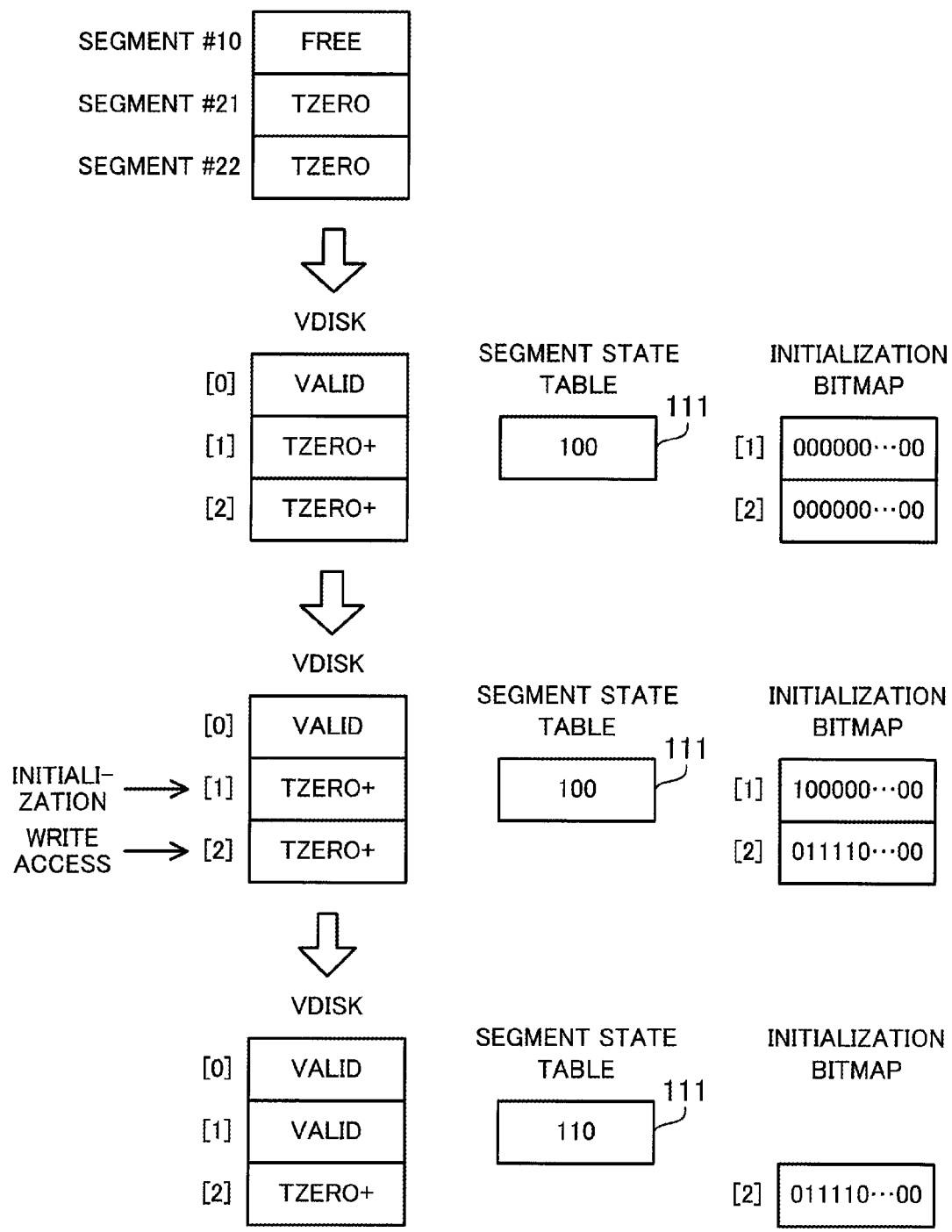
FIG. 20 illustrates an example of changes of states in the logical disk.

FIG. 20 illustrates an example of changes of states in a logical disk. According to the example of FIG. 20, a logical disk is created with Segment #10 in FREE state and Segments #21 and #22 in TZERO state. Segment #10 is positioned first (index=0) in the logical disk, and then the state changes from FREE to VALID. Segment #21 is positioned second (index=1) in the logical disk, and then the state changes from TZERO to TZERO+. Segment #22 is positioned third (index=2) in the logical disk, and then the state changes from TZERO to TZERO+.

When this logical disk is connected to a virtual machine, the segment state table 111 with an initialization flag string being '100' is generated in the I/O server 100. In addition, in association with the second and third segments whose initialization has not been completed, two initialization bitmaps with all initialization bits being 0's are generated in the I/O server 100.

Subsequently, when the management server 400 instructs initialization of Segment #21, for example, the second segment in the logical disk is initialized sequentially, starting from the first chunk. When the initialization of the first chunk is completed, the first initialization bit in the initialization bitmap corresponding to the second segment is updated from 0 to 1. In addition, when the access server 300 issues an access request designating a storage area spanning Chunks #1 to #4 in the third segment, Chunks #1 to #4 are initialized. In this regard, each of the second to fifth initialization bits in the initialization bitmap corresponding to the third segment is updated from 0 to 1.

Subsequently, when all the chunks of Segment #21 are initialized and, therefore, the state of Segment #21 changes from TZERO+ to VALID, the initialization flag string of the segment state table 111 is updated to '110'. In addition, the initialization bitmap corresponding to the second segment of the logical disk is deleted from the I/O server 100.

According to the storage system of the second embodiment, it is possible to create a logical disk using segments whose initialization has yet to be competed and allocate the logical disk to a virtual machine, to thereby reduce the time for a user to wait for allocation of storage areas provided by the storage apparatuses 200 and 200a. In addition, exclusive control is performed by chunk units, which are generated by subdividing each segment. This reduces the likelihood that data access wait occurs due to background initialization being running. In addition, the storage system of the second embodiment is capable of achieving the efficiency of data access while achieving the efficiency of the initialization process, thus improving the processing efficiency of the storage system.

For example, in response to an access request indicating data write access to a chunk, issued by a virtual machine, data is directly written to a designated storage area without initialization of the storage area. Herewith, it is possible to reduce the delay in responding to the virtual machine. In addition, a non-designated storage area within the chunk is subjected to initialization. This allows the entire chunk to be treated as having been initialized, which simplifies control of the initialization process running in the background.

In addition, in response to an access request indicating data read access to a chunk, issued by a virtual machine, the entire chunk is initialized, thereby reducing load generated when the chunk is accessed a plurality of times, for example. Because a non-designated storage area within the chunk is also subjected to initialization, the entire chunk is treated as having been initialized. This simplifies control of the initialization process running in the background.

Note that, as described above, the data access method of the first embodiment is implemented by causing the computer 10 to execute a program. Also, the data access method of the second embodiment is implemented by individually causing the I/O servers 100 and 100a, the storage apparatuses 200 and 200a, the access servers 300 and 300a, and the management server 400, each functioning as a computer, to execute a program. The program may be recorded in a computer-readable storage medium (for example, the storage medium 53). Examples of such a computer-readable recording medium include a magnetic disk, an optical disk, a magneto-optical disk, and a semiconductor memory. Examples of the magnetic disk are a flexible disk and a HDD. Examples of the optical disk are a compact disc (CD), a CD-recordable (CD-R), a CD-rewritable (CD-RW), a DVD, a DVD-R, and a DVD-RW.

To distribute the program, for example, portable storage media with the program recorded thereon are provided. In addition, the program may be stored in a memory device of a different computer and then distributed via a network. A computer stores the program recorded in a portable storage medium or received from the different computer in a memory device (for example, the HDD 103), for example, and reads the program from the memory device to execute it. Note however that the computer may directly execute the program read from the portable storage medium, or directly execute the program received from the different computer via the network.

According to one aspect, it is possible to improve the processing efficiency of a system allowing data access during initialization processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data access method executed by a storage system including one or more memory apparatuses, the data access method comprising:
   starting, by a processor, a first process to proceed with initialization of a plurality of blocks of the memory apparatuses regardless of access requests, and updating exclusion information according to progress of the first process, the exclusion information indicating which one of the plurality of blocks is being initialized;
   determining, by the processor, upon receiving an access request to read data from a first storage area being a part of a block whose initialization has not been completed, whether the block indicated by the access request is being initialized by the first process in reference to the exclusion information;
   executing, when the block is not being initialized by the first process, by the processor, a second process to complete initialization of the block by instructing the memory apparatuses to initialize the first storage area and a second storage area not designated by the access request, the second storage area being a remaining storage area of the block other than the first storage area; and
   returning, by the processor, data corresponding to the initialized first storage area as a response to the access request.

2. A non-transitory computer-readable storage medium storing a computer program that causes a computer used in a storage system to perform a procedure, the storage system including one or more memory apparatuses, the procedure comprising:
   starting a first process to proceed with initialization of a plurality of blocks of the memory apparatuses regardless of access requests, and updating exclusion information according to progress of the first process, the exclusion information indicating which one of the plurality of blocks is being initialized;
   determining, upon receiving an access request to read data from a first storage area being a part of a block whose initialization has not been completed, whether the block indicated by the access request is being initialized by the first process in reference to the exclusion information;
   executing, when the block is not being initialized by the first process, a second process to complete initialization of the block by instructing the memory apparatuses to initialize the first storage area and a second storage area not designated by the access request, the second storage area being a remaining storage area of the block other than the first storage area; and
   returning data corresponding to the initialized first storage area as a response to the access request.

3. A data access apparatus to access one or more memory apparatuses, the data access apparatus comprising:
   a processor configured to perform a procedure including:
      starting a first process to proceed with initialization of a plurality of blocks of the memory apparatuses regardless of access requests, and updating exclusion information according to progress of the first process, the exclusion information indicating which one of the plurality of blocks is being initialized;
      determining, upon receiving an access request for a first storage area being a part of a block whose initialization has not been completed, whether the block indicated by the access request is being initialized by the first process in reference to the exclusion information;
      executing, when the block is not being initialized by the first process and the access request is a write request, a third process to write data to the first storage area without initializing the first storage area and to complete initialization of the block by instructing the memory apparatuses to initialize a second storage area not designated by the access request, the second storage area being a remaining storage area of the block other than the first storage area; and
      executing, when the block is not being initialized by the first process and the access request is a read request, a second process to complete initialization of the block by instructing the memory apparatuses to initialize the first storage area and the second storage area, and returning data corresponding to the initialized first storage area as a response to the access request.

* * * * *